US008239593B2

(12) United States Patent
Elizarov et al.

(10) Patent No.: US 8,239,593 B2
(45) Date of Patent: *Aug. 7, 2012

(54) HANDHELD ELECTRONIC DEVICE WITH TEXT DISAMBIGUATION ALLOWING DYNAMIC EXPANSION OF INPUT KEY ASSOCIATIONS

(75) Inventors: Michael Elizarov, Waterloo (CA); Vadim Fux, Waterloo (CA); Dan Rubanovich, Toronto (CA)

(73) Assignee: Research In Motion Limited, Waterloo, Ontario (CA)

( * ) Notice: Subject to any disclaimer, the term of this patent is extended or adjusted under 35 U.S.C. 154(b) by 85 days.

This patent is subject to a terminal disclaimer.

(21) Appl. No.: 12/619,998

(22) Filed: Nov. 17, 2009

(65) Prior Publication Data

US 2010/0138741 A1    Jun. 3, 2010

Related U.S. Application Data

(63) Continuation of application No. 11/216,523, filed on Aug. 31, 2005, now Pat. No. 7,644,209.

(51) Int. Cl.
*G06F 13/12* (2006.01)
*G06F 3/23* (2006.01)

(52) U.S. Cl. .......................................... 710/67; 345/168
(58) Field of Classification Search ...................... 710/67
See application file for complete search history.

(56) References Cited

U.S. PATENT DOCUMENTS

| 5,634,066 | A | | 5/1997 | Takehara et al. |
| 5,818,437 | A | * | 10/1998 | Grover et al. ................. 715/811 |
| 5,945,928 | A | * | 8/1999 | Kushler et al. ................. 341/28 |
| 5,952,942 | A | | 9/1999 | Balakrishnan et al. |
| 5,953,541 | A | | 9/1999 | King et al. |
| 6,307,549 | B1 | | 10/2001 | King et al. |
| 6,363,347 | B1 | * | 3/2002 | Rozak ........................... 704/244 |
| 6,684,185 | B1 | * | 1/2004 | Junqua et al. ................. 704/243 |
| 7,091,885 | B2 | | 8/2006 | Fux et al. |
| 2002/0123367 | A1 | | 9/2002 | Savolainen et al. |
| 2002/0126097 | A1 | | 9/2002 | Savolainen |
| 2005/0027524 | A1 | * | 2/2005 | Wu et al. ....................... 704/235 |
| 2005/0283358 | A1 | * | 12/2005 | Stephanick et al. ............. 704/7 |

FOREIGN PATENT DOCUMENTS

| EP | 1093058 A1 | 4/2001 |
| EP | 1237068 A2 | 9/2002 |
| EP | 1256871 A2 | 11/2002 |
| EP | 1248183 A3 | 4/2006 |
| WO | 00/62150 | 10/2000 |
| WO | 2004/001979 A1 | 12/2003 |
| WO | 2004/003721 A2 | 1/2004 |

* cited by examiner

*Primary Examiner* — Henry Tsai
*Assistant Examiner* — Titus Wong
(74) *Attorney, Agent, or Firm* — Finnegan, Henderson, Farabow, Garrett & Dunner, LLP

(57) ABSTRACT

A handheld electronic device includes a reduced QWERTY keyboard and is enabled with disambiguation software. The device provides output in the form of a default output and a number of variants. The output is based largely upon the frequency, i.e., the likelihood that a user intended a particular output, but various features of the device provide additional variants that are not based solely on frequency and rather are provided by various logic structures resident on the device. The device enables editing during text entry and also provides a learning function that allows the disambiguation function to adapt to provide a customized experience for the user. The disambiguation function can be selectively disabled and an alternate keystroke interpretation system provided. Additionally, the device can facilitate the selection of variants by displaying a graphic of a special <NEXT> key of the keypad that enables a user to progressively select variants generally without changing the position of the user's hands on the device. If a field into which text is being entered is determined to be a special input field, a disambiguated result can be sought first from a predetermined data source prior to seeking results from other data sources on the device.

18 Claims, 12 Drawing Sheets

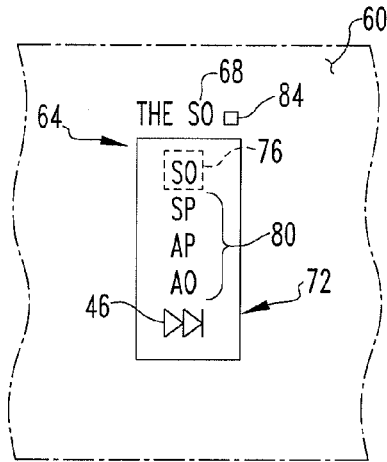
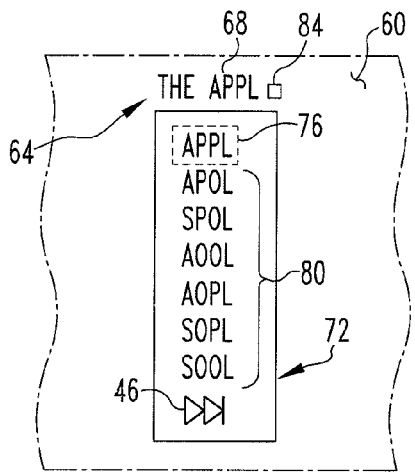
FIG.7    FIG.8
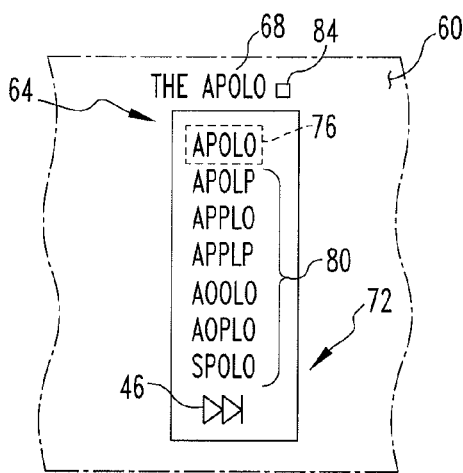
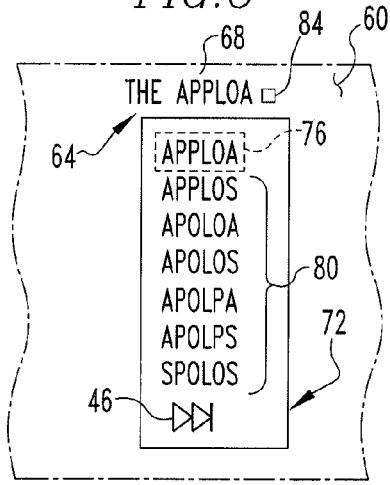
FIG.9    FIG.10
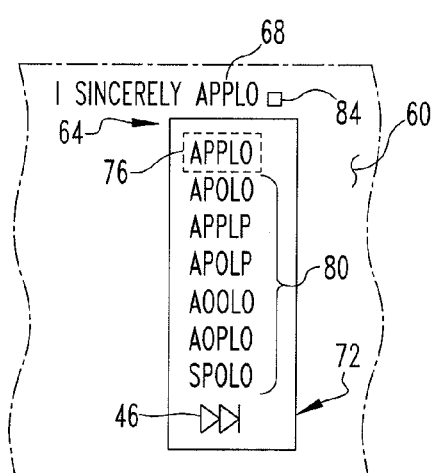
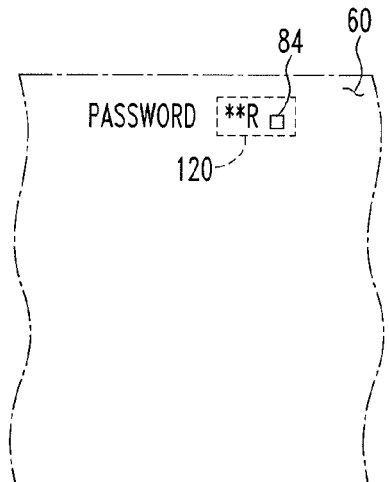
FIG.11    FIG.12

HANDHELD ELECTRONIC DEVICE WITH TEXT DISAMBIGUATION ALLOWING DYNAMIC EXPANSION OF INPUT KEY ASSOCIATIONS

CROSS-REFERENCE TO RELATED APPLICATION

The instant application is a continuation application of U.S. patent application Ser. No. 11/216,523 filed Aug. 31, 2005, now U.S. Pat. No. 7,644,209 the disclosure of which is incorporated herein by reference.

BACKGROUND

1. Field

The invention relates generally to handheld electronic devices and, more particularly, to a handheld electronic device having a reduced keyboard and an input disambiguation function, and also relates to an associated method.

2. Description of the Related Art

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices.

Such handheld electronic devices are generally intended to be portable, and thus are of a relatively compact configuration in which keys and other input structures often perform multiple functions under certain circumstances or may otherwise have multiple aspects or features assigned thereto. With advances in technology, handheld electronic devices are built to have progressively smaller form factors yet have progressively greater numbers of applications and features resident thereon. As a practical matter, the keys of a keypad can only be reduced to a certain small size before the keys become relatively unusable. In order to enable text entry, however, a keypad must be capable of entering all twenty-six letters of the Latin alphabet, for instance, as well as appropriate punctuation and other symbols.

One way of providing numerous letters in a small space has been to provide a "reduced keyboard" in which multiple letters, symbols, and/or digits, and the like, are assigned to any given key. For example, a touch-tone telephone includes a reduced keypad by providing twelve keys, of which ten have digits thereon, and of these ten keys eight have Latin letters assigned thereto. For instance, one of the keys includes the digit "2" as well as the letters "A", "B", and "C". Other known reduced keyboards have included other arrangements of keys, letters, symbols, digits, and the like. Since a single actuation of such a key potentially could be intended by the user to refer to any of the letters "A", "B", and "C", and potentially could also be intended to refer to the digit "2", the input generally is an ambiguous input and is in need of some type of disambiguation in order to be useful for text entry purposes.

In order to enable a user to make use of the multiple letters, digits, and the like on any given key, numerous keystroke interpretation systems have been provided. For instance, a "multi-tap" system allows a user to substantially unambiguously specify a particular character on a key by pressing the same key a number of times equivalent to the position of the desired character on the key. For example, on the aforementioned telephone key that includes the letters "ABC", and the user desires to specify the letter "C", the user will press the key three times. While such multi-tap systems have been generally effective for their intended purposes, they nevertheless can require a relatively large number of key inputs compared with the number of characters that ultimately are output.

Another exemplary keystroke interpretation system would include key chording, of which various types exist. For instance, a particular character can be entered by pressing two keys in succession or by pressing and holding a first key while pressing a second key. Still another exemplary keystroke interpretation system would be a "press-and-hold/press-and-release" interpretation function in which a given key provides a first result if the key is pressed and immediately released, and provides a second result if the key is pressed and held for a short period of time. While these systems have likewise been generally effective for their intended purposes, such systems also have their own unique drawbacks.

Another exemplary keystroke interpretation system that has been employed is a software-based text disambiguation function. In such a system, a user typically presses keys to which one or more characters have been assigned, generally pressing each key one time for each desired letter, and the disambiguation software attempts to predict the intended input. Numerous such systems have been proposed, and while many have been generally effective for their intended purposes, shortcomings still exist.

It would be desirable to provide an improved handheld electronic device with a reduced keyboard that seeks to mimic a QWERTY keyboard experience or other particular keyboard experience. Such an improved handheld electronic device might also desirably be configured with enough features to enable text entry and other tasks with relative ease.

SUMMARY

In view of the foregoing, an improved handheld electronic device includes a keypad in the form of a reduced QWERTY keyboard and is enabled with disambiguation software. As a user enters keystrokes, the device provides output in the form of a default output and a number of variants from which a user can choose. The output is based largely upon the frequency, i.e., the likelihood that a user intended a particular output, but various features of the device provide additional variants that are not based solely on frequency and rather are provided by various logic structures resident on the device. The device enables editing during text entry and also provides a learning function that allows the disambiguation function to adapt to provide a customized experience for the user. The device is also configured to enable the entry and learning of new characters, as well as new words that comprise the new characters.

Accordingly, an aspect is to provide an improved handheld electronic device and an associated method, with the handheld electronic device including a reduced keyboard that seeks to simulate a QWERTY keyboard experience or another particular keyboard experience.

Another aspect is to provide an improved handheld electronic device and an associated method that provide a text input disambiguation function.

Another aspect is to provide an improved handheld electronic device and an associated method that employ a disambiguation function which, responsive to an ambiguous input, provides a number of proposed outputs according to relative frequency.

Another aspect is to provide an improved handheld electronic device and an associated method that provide a number of proposed outputs that can be based upon relative frequency and/or can result from various logic structures resident on the device.

Another aspect is to provide an improved handheld electronic device and an associated method that enable a custom experience by a user based upon various learning features and other features.

Another aspect is to provide an improved handheld electronic device and an associated method that employ a disambiguation function and that enable the entry and learning of new characters, as well as the entry and learning of new words that comprise the new characters.

Another aspect is to provide an improved handheld electronic device and an associated method, wherein the handheld electronic device includes an input apparatus which facilitates the selection of variants with relative ease.

Another aspect is to provide an improved handheld electronic device and an associated method that employ a disambiguation function to disambiguate text input from a reduced QWERTY keyboard or other keyboard and that allow editing of the text input.

Accordingly, an aspect is to provide an improved method of enabling input into a handheld electronic device of a type including an input apparatus, an output apparatus, and a memory. The memory has stored therein a number of linguistic elements, an alphabet, and a number of objects, with at least some of the linguistic elements each being in the alphabet. The number of objects comprise a number of language objects, and at least some of the language objects each comprise a number of the linguistic elements in the alphabet. The input apparatus includes a plurality of input members, with at least some of the input members each having a number of the linguistic elements assigned thereto. The general nature of the method can be stated as including detecting as a first input an input of a new language object comprising at least a first new linguistic element different than the linguistic elements in the alphabet, and storing the at least a first new linguistic element. The method further includes detecting as a second input an ambiguous input comprising a number of actuations of a number of the input members, generating a number of prefix objects each having a number of the linguistic elements of the input members of the ambiguous input, with at least one of the prefix objects including the at least a first new linguistic element and, for each prefix object of at least some of the prefix objects, seeking a corresponding language object that corresponds with the prefix object.

Another aspect is to provide an improved handheld electronic device, the general nature of which can be stated as including a processor apparatus and an input apparatus. The processor apparatus comprises a processor and a memory. The memory has stored therein a number of linguistic elements, an alphabet, and a number of objects. At least some of the linguistic elements each are in the alphabet. The number of objects comprise a number of language objects. At least some of the language objects each comprise a number of the linguistic elements in the alphabet. The input apparatus includes a plurality of input members. At least some of the input members each have a number of the linguistic elements assigned thereto. The alphabet is expandable to have added thereto a number of additional linguistic elements upon entry of a new language object having at least a first linguistic element not already in the alphabet.

BRIEF DESCRIPTION OF THE DRAWINGS

A full understanding can be gained from the following Description of the Preferred Embodiment when read in conjunction with the accompanying drawings in which:

FIG. 7 is an exemplary output during a text entry operation;

FIG. 8 is another exemplary output during another part of the text entry operation;

FIG. 9 is another exemplary output during another part of the text entry operation;

FIG. 10 is another exemplary output during another part of the text entry operation;

FIG. 11 is an exemplary output on the handheld electronic device during another text entry operation;

FIG. 12 is an exemplary output that can be provided in an instance when the disambiguation function of the handheld electronic device has been disabled;

Similar numerals refer to similar parts throughout the specification.

DESCRIPTION OF THE PREFERRED EMBODIMENT

Figure 1:
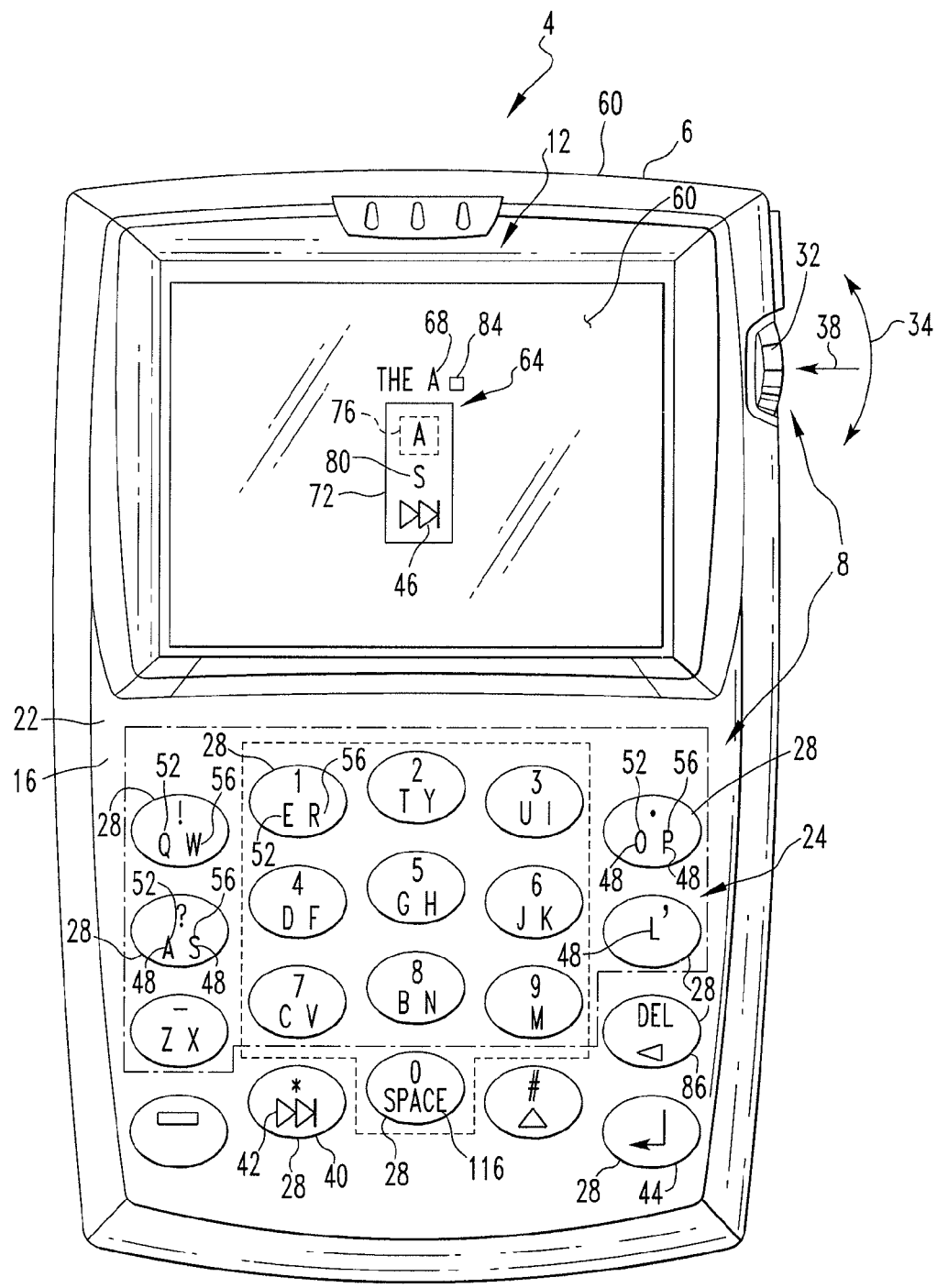
FIG. 1 is a top plan view of an improved handheld electronic device in accordance with the invention.
Figure 2:
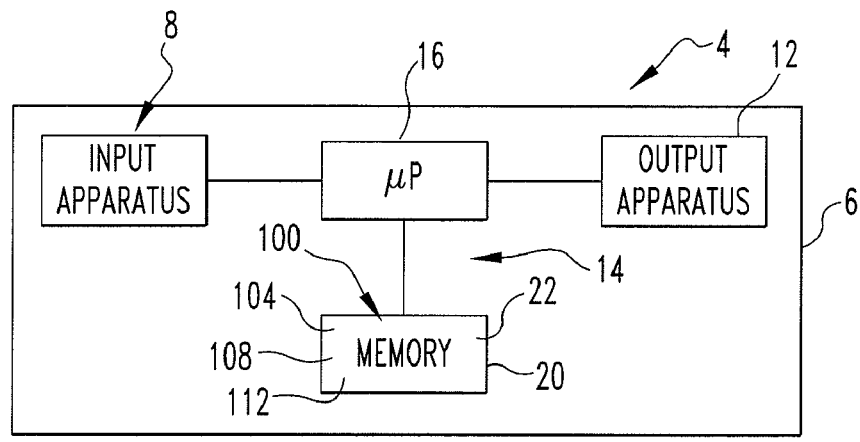
FIG. 2 is a schematic depiction of the improved handheld electronic device of FIG. 1.

An improved handheld electronic device 4 is indicated generally in FIG. 1 and is depicted schematically in FIG. 2. The exemplary handheld electronic device 4 includes a housing 6 upon which are disposed an input apparatus 8, an output apparatus 12, and a processor apparatus 14. The processor apparatus 14 includes a processor 16 and a memory 20, and additionally includes a number of routines depicted generally with the numeral 22 for the processing of data. The processor 16 may be, for instance, and without limitation, a microprocessor (µP) and is responsive to inputs from the input apparatus 8 and provides output signals to the output apparatus 12.

The processor 16 also interfaces with the memory 20. Examples of handheld electronic devices are included in U.S. Pat. Nos. 6,452,588 and 6,489,950, which are incorporated by record herein.

As can be understood from FIG. 1, the input apparatus 8 includes a keypad 24 and a thumbwheel 32. As will be described in greater detail below, the keypad 24 is in the exemplary form of a reduced QWERTY keyboard including a plurality of keys 28 that serve as input members. It is noted, however, that the keypad 24 may be of other configurations, such as an AZERTY keyboard, a QWERTZ keyboard, or other keyboard arrangement, whether presently known or unknown, and either reduced or not reduced. As employed herein, the expression "reduced" and variations thereof in the context of a keyboard, a keypad, or other arrangement of input members, shall refer broadly to an arrangement in which at least one of the input members has assigned thereto a plurality of linguistic elements such as, for example, characters in the set of Latin letters, whereby an actuation of the at least one of the input members, without another input in combination therewith, is an ambiguous input since it could refer to more than one of the plurality of linguistic elements assigned thereto. As employed herein, the expression "linguistic element" and variations thereof shall refer broadly to any element that itself can be a language object or from which a language object can be constructed, identified, or otherwise obtained, and thus would include, for example and without limitation, characters, letters, strokes, ideograms, phonemes, morphemes, digits, and the like. As employed herein, the expression "language object" and variations thereof shall refer broadly to any type of object that may be constructed, identified, or otherwise obtained from one or more linguistic elements, that can be used alone or in combination to generate text, and that would include, for example and without limitation, words, "shortcuts", symbols, ideograms, and the like. An example of one type of shortcut might be the use of the expression "BTW" to refer as a shortcut to the phrase "by the way", it being the intention that the person reading the message will understand the shortcut "BTW" to mean "by the way."

The system architecture of the handheld electronic device 4 advantageously is organized to be operable independent of the specific layout of the keypad 24. Accordingly, the system architecture of the handheld electronic device 4 can be employed in conjunction with virtually any keypad layout substantially without requiring any meaningful change in the system architecture. It is further noted that certain of the features set forth herein are usable on either or both of a reduced keyboard and a non-reduced keyboard.

The keys 28 are disposed on a front face of the housing 6, and the thumbwheel 32 is disposed at a side of the housing 6. The thumbwheel 34 can serve as another input member and is both rotatable, as is indicated by the arrow 34, to provide selection and/or navigational inputs to the processor 16, and also can be pressed in a direction generally toward the housing 6, as is indicated by the arrow 38, to provide another selection input to the processor 16.

Among the keys 28 of the keypad 24 are a <NEXT> key 40 and an <ENTER> key 44. The <NEXT> key 40 can be pressed to provide a selection input to the processor 16 and provides substantially the same selection input as is provided by a rotational input of the thumbwheel 32 when certain routines are active on the handheld electronic device 4. Since the <NEXT> key 40 is provided adjacent a number of the other keys 28 of the keypad 24, the user can provide a selection input to the processor 16 substantially without moving the user's hands away from the keypad 24 during a text entry operation. As will be described in greater detail below, the <NEXT> key 40 additionally and advantageously includes a graphic 42 disposed thereon, and in certain circumstances the output apparatus 12 also displays a displayed graphic 46 thereon to identify the <NEXT> key 40 as being able to provide a selection input to the processor 16. In this regard, the displayed graphic 46 of the output apparatus 12 is substantially similar to the graphic 42 on the <NEXT> key and thus identifies the <NEXT> key 40 as being capable of providing a desirable selection input to the processor 16.

As can further be seen in FIG. 1, many of the keys 28 include a number of linguistic elements 48 disposed thereon. As employed herein, the expression "a number of" and variations thereof shall refer broadly to any quantity, including a quantity of one. In the exemplary depiction of the keypad 24, many of the keys 28 include two linguistic elements 48 disposed thereon, such as including a first linguistic element 52 and a second linguistic element 56 thereon.

One of the keys 28 of the keypad 24 includes as the characters 48 and as the first and second linguistic elements 52 and 56 thereof the letters "Q" and "W", and an adjacent key 28 includes as the characters 48 and as the first and second linguistic elements 52 and 56 thereof the letters "E" and "R". It can be seen that the arrangement of the characters 48 on the keys 28 of the keypad 24 is generally of a QWERTY arrangement, albeit with many of the keys 28 including two of the characters 28.

The output apparatus 12 includes a display 60 upon which can be provided an output 64. An exemplary output 64 is depicted on the display 60 in FIG. 1. The output 64 includes a text component 68 and a variant component 72. The variant component 72 includes a default portion 76 and a variant portion 80. The display also includes a caret 84 that depicts generally where the next input from the input apparatus 8 will be received.

The text component 68 of the output 64 provides a depiction of the default portion 76 of the output 64 at a location on the display 60 where the text is being input. The variant component 72 is disposed generally in the vicinity of the text component 68 and provides, in addition to the default proposed output 76, a depiction of the various alternate text choices, i.e., alternates to the default proposed output 76, that are proposed by an input disambiguation function in response to an input sequence of key actuations of the keys 28.

As will be described in greater detail below, the default portion 76 is proposed by the disambiguation function as being the most likely disambiguated interpretation of the ambiguous input provided by the user. The variant portion 80 includes a predetermined quantity of alternate proposed interpretations of the same ambiguous input from which the user can select, if desired. The displayed graphic 46 typically is provided in the variant component 72 in the vicinity of the variant portion 80, although it is understood that the displayed graphic 46 could be provided in other locations and in other fashions without departing from the present concept. It is also noted that the exemplary variant portion 80 is depicted herein as extending vertically below the default portion 76, but it is understood that numerous other arrangements could be provided without departing from the concept of the invention.

Among the keys 28 of the keypad 24 additionally is a <DELETE> key 86 that can be provided to delete a text entry. As will be described in greater detail below, the <DELETE> key 86 can also be employed in providing an alternation input to the processor 16 for use by the disambiguation function.

Figure 2A:
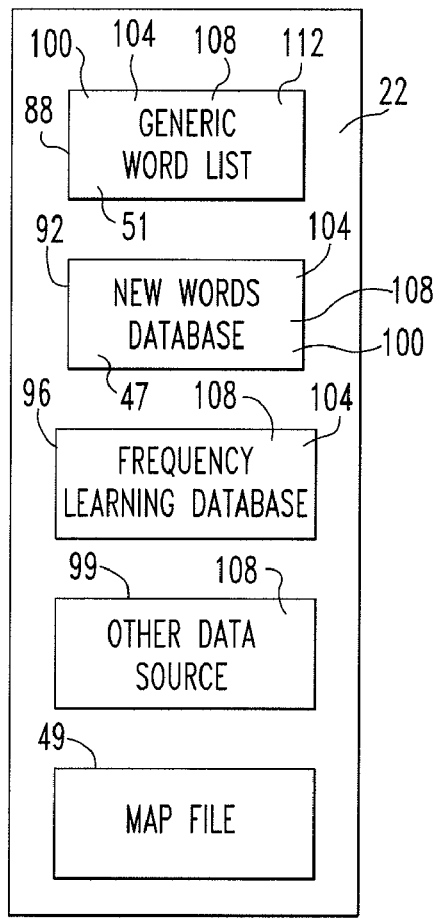
FIG. 2A is a schematic depiction of a portion of the handheld electronic device of FIG. 2.

The memory 20 is depicted schematically in FIG. 2A. The memory 20 can be any of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory. The routines 22 can be in any of a variety of forms such as, without limitation, software, firmware, and the like. As will be explained in greater detail below, the routines 22 include a disambiguation routine that provides the aforementioned disambiguation function as an application, as well as other routines.

As can be understood from FIG. 2A, the memory 20 additionally includes data stored and/or organized in a number of tables, sets, lists, and/or otherwise. Specifically, the memory 20 includes a generic word list 88, a new words database 92, and a frequency learning database 96. The memory 20 additionally has stored therein another data source 99 and a map file 49, both of which are described elsewhere herein in greater detail.

Stored within the various areas of the memory 20 are a number of language objects 100 and frequency objects 104. The language objects 100 generally are each associated with an associated frequency object 104. The language objects 100 include, in the present exemplary embodiment, a plurality of word objects 108 and a plurality of N-gram objects 112. The word objects 108 are generally representative of complete words within the language or custom words stored in the memory 22. For instance, if the language stored in the memory is, for example, English, generally each word object 108 would represent a word in the English language or would represent a custom word.

Associated with substantially each word object 108 is a frequency object 104 having frequency value that is indicative of the relative frequency within the relevant language of the given word represented by the word object 108. In this regard, the generic word list 88 includes a corpus of word objects 108 and associated frequency objects 104 that together are representative of a wide variety of words and their relative frequency within a given vernacular of, for instance, a given language. The generic word list 88 can be derived in any of a wide variety of fashions, such as by analyzing numerous texts and other language sources to determine the various words within the language sources as well as their relative probabilities, i.e., relative frequencies, of occurrences of the various words within the language sources.

The N-gram objects 112 stored within the generic word list 88 are short strings of characters within the relevant language typically, for example, one to three characters in length, and typically represent word fragments within the relevant language, although certain of the N-gram objects 112 additionally can themselves be words. However, to the extent that an N-gram object 112 also is a word within the relevant language, the same word likely would be separately stored as a word object 108 within the generic word list 88. As employed herein, the expression "string" and variations thereof shall refer broadly to an object having one or more characters or components, and can refer to any of a complete word, a fragment of a word, a custom word or expression, and the like.

In the present exemplary embodiment of the handheld electronic device 4, the N-gram objects 112 include 1-gram objects, i.e., string objects that are one character in length, 2-gram objects, i.e., string objects that are two characters in length, and 3-gram objects, i.e., string objects that are three characters in length, all of which are collectively referred to as N-grams 112. Substantially each N-gram object 112 in the generic word list 88 is similarly associated with an associated frequency object 104 stored within the generic word list 88, but the frequency object 104 associated with a given N-gram object 112 has a frequency value that indicates the relative probability that the character string represented by the particular N-gram object 112 exists at any location within any word of the relevant language. The N-gram objects 112 and the associated frequency objects 104 are a part of the corpus of the generic word list 88 and are obtained in a fashion similar to the way in which the word object 108 and the associated frequency objects 104 are obtained, although the analysis performed in obtaining the N-gram objects 112 will be slightly different because it will involve analysis of the various character strings within the various words instead of relying primarily on the relative occurrence of a given word.

The present exemplary embodiment of the handheld electronic device 4, with its exemplary language being the English language, includes twenty-six 1-gram N-gram objects 112, i.e., one 1-gram object for each of the twenty-six letters in the Latin alphabet upon which the English language is based, and further includes 676 2-gram N-gram objects 112, i.e., twenty-six squared, representing each two-letter permutation of the twenty-six letters within the Latin alphabet.

The N-gram objects 112 also include a certain quantity of 3-gram N-gram objects 112, primarily those that have a relatively high frequency within the relevant language. The exemplary embodiment of the handheld electronic device 4 includes fewer than all of the three-letter permutations of the twenty-six letters of the Latin alphabet due to considerations of data storage size, and also because the 2-gram N-gram objects 112 can already provide a meaningful amount of information regarding the relevant language. As will be set forth in greater detail below, the N-gram objects 112 and their associated frequency objects 104 provide frequency data that can be attributed to character strings for which a corresponding word object 108 cannot be identified or has not been identified, and typically is employed as a fallback data source, although this need not be exclusively the case.

In the present exemplary embodiment, the language objects 100 and the frequency objects 104 are maintained substantially inviolate in the generic word list 88, meaning that the basic language corpus remains substantially unaltered within the generic word list 88, and the learning functions that are provided by the handheld electronic device 4 and that are described below operate in conjunction with other objects that are generally stored elsewhere in memory 20, such as, for example, in the new words database 92 and the frequency learning database 96.

The new words database 92 and the frequency learning database 96 store additional language objects 100 and associated frequency objects 104 in order to provide to a user a customized experience in which words and the like that are used relatively more frequently by a user will be associated with relatively higher frequency values than might otherwise be reflected in the generic word list 88. More particularly, the new words database 92 includes word objects 108 that are user-defined and that generally are not found among the word objects 108 of the generic word list 88. Each word object 108 in the new words database 92 has associated therewith an associated frequency object 104 that is also stored in the new words database 92. The frequency learning database 96 stores word objects 108 and associated frequency objects 104 that are indicative of relatively more frequent usage of such words by a user than would be reflected in the generic word list 88. As such, the new words database 92 and the frequency learning database 96 provide two learning functions, that is, they together provide the ability to learn new words as well the ability to learn altered frequency values for known words.

In addition to the word objects 108 and associated frequency objects 104 stored in the new words database 92, the new words database 92 has an alphabet 47 stored therein. The alphabet 47 includes a listing of all of the characters that are comprised by the word objects 108 in the new words database 92.

Figure 3A:
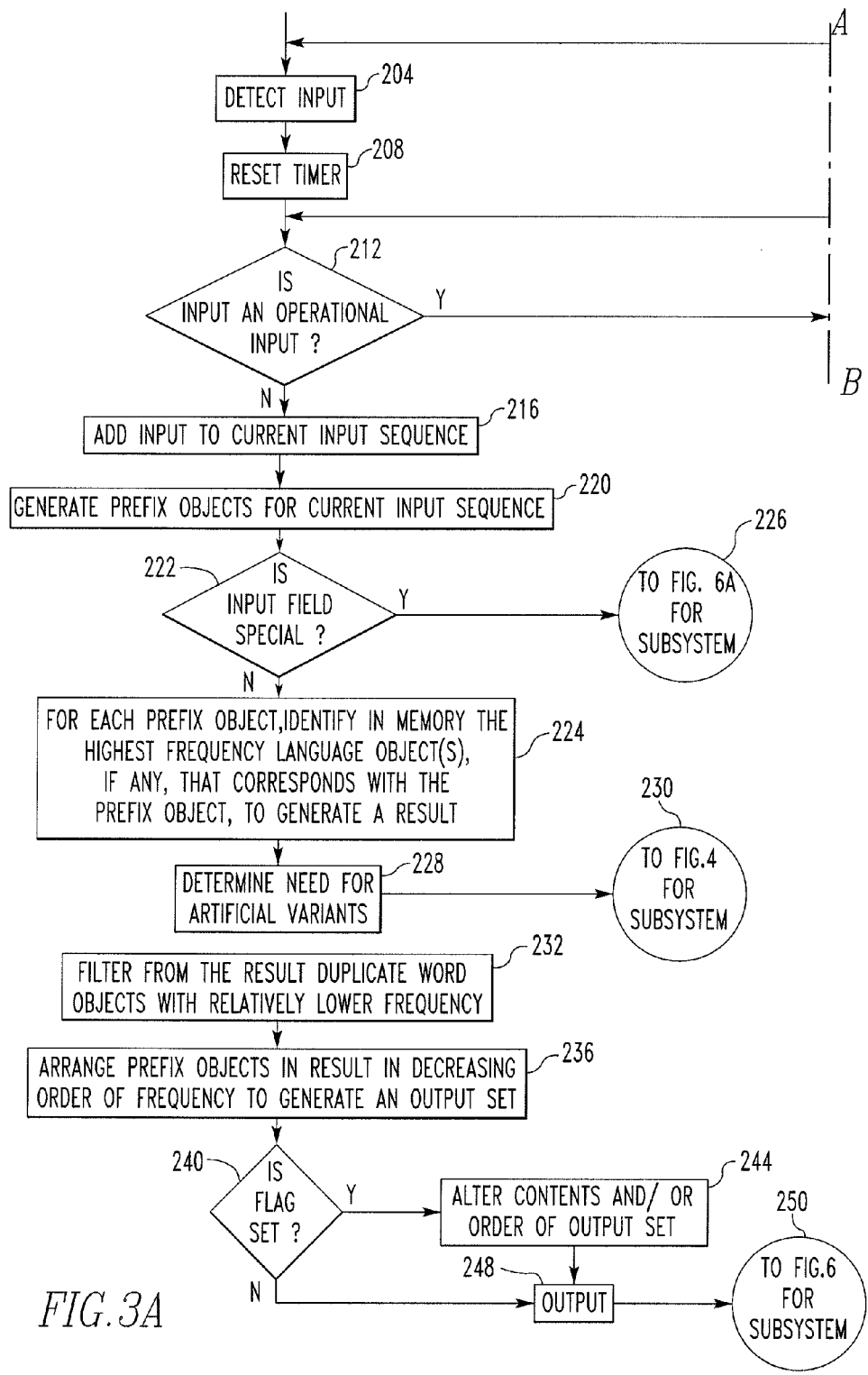
FIGS. 3A and 3B depict an exemplary flowchart depicting certain aspects of a disambiguation function that can be executed on the handheld electronic device of FIG. 1.
Figure 3B:
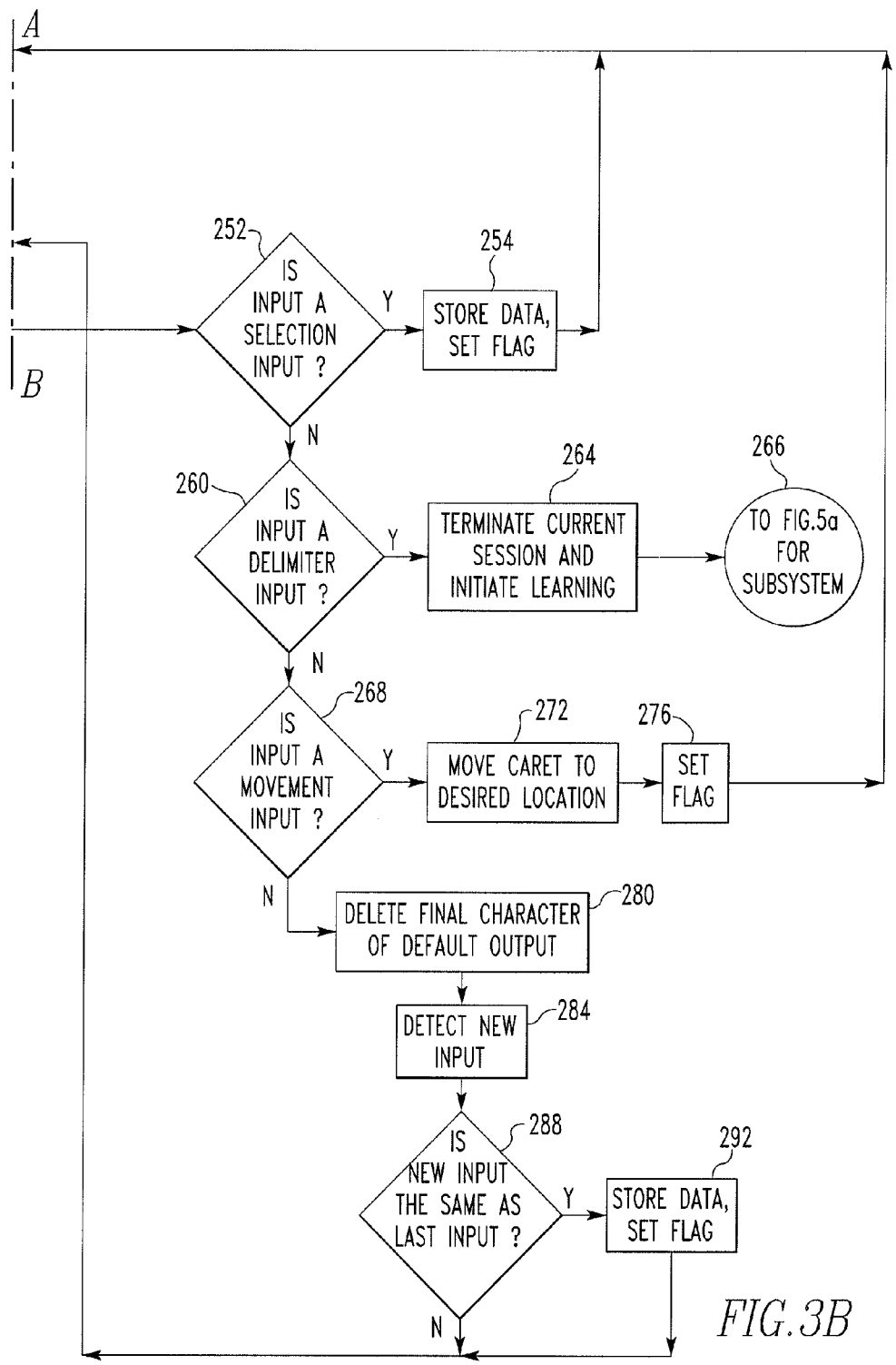

FIGS. 3A and 3B depict in an exemplary fashion the general operation of certain aspects of the disambiguation function of the handheld electronic device 4. Additional features, functions, and the like are depicted and described elsewhere.

An input is detected, as at 204, and the input can be any type of actuation or other operation as to any portion of the input apparatus 8. A typical input would include, for instance, an actuation of a key 28 having a number of characters 48 thereon, or any other type of actuation or manipulation of the input apparatus 8.

Upon detection at 204 of an input, a timer is reset at 208. The use of the timer will be described in greater detail below.

The disambiguation function then determines, as at 212, whether the current input is an operational input, such as a selection input, a delimiter input, a movement input, an alternation input, or, for instance, any other input that does not constitute an actuation of a key 28 having a number of characters 48 thereon. If the input is determined at 212 to not be an operational input, processing continues at 216 by adding the input to the current input sequence which may or may not already include an input.

Many of the inputs detected at 204 are employed in generating input sequences as to which the disambiguation function will be executed. An input sequence is build up in each "session" with each actuation of a key 28 having a number of characters 48 thereon. Since an input sequence typically will be made up of at least one actuation of a key 28 having a plurality of characters 48 thereon, the input sequence will be ambiguous. When a word, for example, is completed the current session is ended an a new session is initiated.

An input sequence is gradually built up on the handheld electronic device 4 with each successive actuation of a key 28 during any given session. Specifically, once a delimiter input is detected during any given session, the session is terminated and a new session is initiated. Each input resulting from an actuation of one of the keys 28 having a number of the characters 48 associated therewith is sequentially added to the current input sequence. As the input sequence grows during a given session, the disambiguation function generally is executed with each actuation of a key 28, i.e., an input, and as to the entire input sequence. Stated otherwise, within a given session, the growing input sequence is attempted to be disambiguated as a unit by the disambiguation function with each successive actuation of the various keys 28.

Once a current input representing a most recent actuation of the one of the keys 28 having a number of the characters 48 assigned thereto has been added to the current input sequence within the current session, as at 216 in FIG. 3A, the disambiguation function generates, as at 220, substantially all of the permutations of the characters 48 assigned to the various keys 28 that were actuated in generating the input sequence. In this regard, the "permutations" refer to the various strings that can result from the characters 48 of each actuated key 28 limited by the order in which the keys 28 were actuated. The various permutations of the characters in the input sequence are employed as prefix objects.

For instance, if the current input sequence within the current session is the ambiguous input of the keys "AS" and "OP", the various permutations of the first character 52 and the second character 56 of each of the two keys 28, when considered in the sequence in which the keys 28 were actuated, would be "SO", "SP", "AP", and "AO", and each of these is a prefix object that is generated, as at 220, with respect to the current input sequence. As will be explained in greater detail below, the disambiguation function seeks to identify for each prefix object one of the word objects 108 for which the prefix object would be a prefix.

The method of the invention also determines, as at 222, whether or not the input field into which language is being entered is a "special" input field. In this regard, a special input field is one to which particular stored data can be of particular relevance, and such particular stored data and is therefore sought to be obtained first before obtaining other data. In effect, therefore, the method can, for instance, provide proposed output results that are particularly suited to the input field. As such, the output results are more likely to be the results desired by the user than otherwise might be the case if all of the data sources were searched in the usual fashion to provide proposed disambiguation results. If the input field is determined by the method to be special, a special flag is set and processing is transferred, as at 226, for further processing, as at 604 in FIG. 6A, as will be discussed in greater detail below.

If, however, the input field is determined as at 222 to not be special, processing continues at 224. For each generated prefix object, the memory 20 is consulted, as at 224, to identify, if possible, for each prefix object one of the word objects 108 in the memory 20 that corresponds with the prefix object, meaning that the sequence of letters represented by the prefix object would be either a prefix of the identified word object 108 or would be substantially identical to the entirety of the word object 108. Further in this regard, the word object 108 that is sought to be identified is the highest frequency word object 108. That is, the disambiguation function seeks to identify the word object 108 that corresponds with the prefix object and that also is associated with a frequency object 104 having a relatively higher frequency value than any of the other frequency objects 104 associated with the other word objects 108 that correspond with the prefix object.

It is noted in this regard that the word objects 108 in the generic word list 88 are generally organized in data tables that correspond with the first two letters of various words. For instance, the data table associated with the prefix "CO" would include all of the words such as "CODE", "COIN", "COMMUNICATION", and the like. Depending upon the quantity of word objects 108 within any given data table, the data table may additionally include sub-data tables within which word objects 108 are organized by prefixes that are three characters or more in length. Continuing onward with the foregoing example, if the "CO" data table included, for instance, more than 256 word objects 108, the "CO" data table would additionally include one or more sub-data tables of word objects 108 corresponding with the most frequently appearing three-letter prefixes. By way of example, therefore, the "CO" data table may also include a "COM" sub-data table and a "CON" sub-data table. If a sub-data table includes more than the predetermined number of word objects 108, for example a quantity of 256, the sub-data table may include further sub-data tables, such as might be organized according to a four letter prefixes. It is noted that the aforementioned quantity of 256 of the word objects 108 corresponds with the greatest numerical value that can be stored within one byte of the memory 20.

Accordingly, when, at 224, each prefix object is sought to be used to identify a corresponding word object 108, and for instance the instant prefix object is "AP", the "AP" data table will be consulted. Since all of the word objects 108 in the "AP" data table will correspond with the prefix object "AP", the word object 108 in the "AP" data table with which is associated a frequency object 104 having a frequency value relatively higher than any of the other frequency objects 104 in the "AP" data table is identified. The identified word object 108 and the associated frequency object 104 are then stored in a result register that serves as a result of the various comparisons of the generated prefix objects with the contents of the memory 20.

It is noted that one or more, or possibly all, of the prefix objects will be prefix objects for which a corresponding word object 108 is not identified in the memory 20. Such prefix objects are considered to be orphan prefix objects and are separately stored or are otherwise retained for possible future use. In this regard, it is noted that many or all of the prefix objects can become orphan object if, for instance, the user is trying to enter a new word or, for example, if the user has mis-keyed and no word corresponds with the mis-keyed input.

Once the result has been obtained at 224, the disambiguation function determines, as at 228, whether artificial variants should be generated. In order to determine the need for artificial variants, the process at 228 branches, as at 230, to the artificial variant process depicted generally in FIG. 4 and beginning with the numeral 304. The disambiguation function then determines, as at 308, whether any of the prefix objects in the result correspond with what had been the default output 76 prior to detection of the current key input. If a prefix object in the result corresponds with the previous default output, this means that the current input sequence corresponds with a word object 108 and, necessarily, the previous default output also corresponded with a word object 108 during the previous disambiguation cycle within the current session.

The next point of analysis is to determine, as at 310, whether the previous default output was made the default output because of a selection input, such as would have caused the setting a flag, such as at 254 of FIG. 3B, discussed in greater detail below. In the event that the previous default output was not the result of a selection input, no artificial variants are needed, and the process returns, as at 312, to the main process at 232. However, if it is determined at 310 that the previous default output was the result of a selection input, then artificial variants are generated, as at 316.

More specifically, each of the artificial variants generated at 316 include the previous default output plus one of the characters 48 assigned to the key 28 of the current input. As such, if the key 28 of the current input has two characters, i.e., a first character 52 and a second character 56, two artificial variants will be generated at 316. One of the artificial variants will include the previous default output plus the first character 52. The other artificial variant will include the previous default output plus the second character 56.

However, if it is determined at 308 that none of the prefix objects in the result correspond with the previous default output, it is next necessary to determine, as at 314, whether the previous default output had corresponded with a word object 108 during the previous disambiguation cycle within the current session. If the answer to the inquiry at 314 is no, it is still necessary to determine, as at 318, whether the previous default output was made the default output because of a selection input, such as would have causes the setting of the flag. In the event that the previous default output was not the result of a selection input, no artificial variants are needed, and the process returns, as at 312, to the main process at 232. However, if it is determined at 318 that the previous default output was the result of a selection input, then artificial variants are generated, as at 316.

On the other hand, if it is determined that the answer to the inquiry at 314 is yes, meaning that the previous default output had corresponded with a word object, but with the current input the previous default output combined with the current input has ceased to correspond with any word object 108, then artificial variants are generated, again as at 316.

After the artificial variants are generated at 316, the method then determines, as at 320, whether the result includes any prefix objects at all. If not, processing returns, as at 312, to the main process at 232. However, if it is determined at 320 that the result includes at least a first prefix object, meaning that the current input sequence corresponds with a word object 108, processing is transferred to 324 where an additional artificial variant is created. Specifically, the prefix object of the result with which is associated the frequency object 104 having the relatively highest frequency value among the other frequency objects 104 in the result is identified, and the artificial variant is created by deleting the final character from the identified prefix object and replacing it with an opposite character 48 on the same key 28 of the current input that generated the final character 48 of the identified prefix object. In the event that the specific key 28 has more than two characters 48 assigned thereto, each such opposite character 48 will be used to generate an additional artificial variant.

Figure 4:
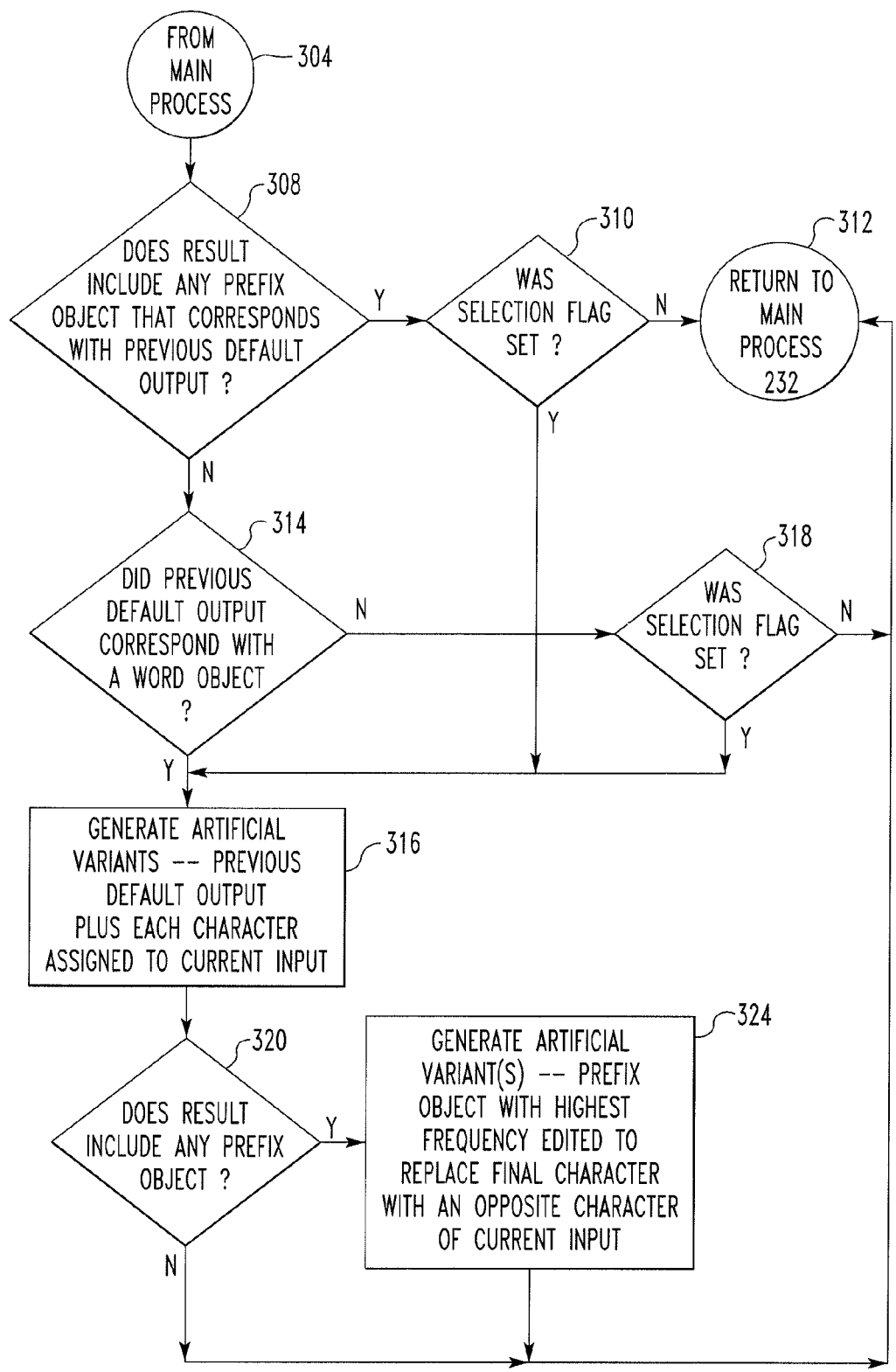
FIG. 4 is another exemplary flowchart depicting certain aspects of a disambiguation function that can be executed on the handheld electronic device by which certain output variants can be provided to the user.

Once the need for artificial variants has been identified, as at 228, and such artificial variants have been generated, as in FIG. 4 and as described above, processing continues, as at 232, where duplicate word objects 108 associated with relatively lower frequency values are deleted from the result. Such a duplicate word object 108 could be generated, for instance, by the frequency learning database 96, as will be set forth in greater detail below. If a word object 108 in the result matches one of the artificial variants, the word object 108 and its associated frequency object 104 generally will be removed from the result because the artificial variant will be assigned a preferred status in the output 64, likely in a position preferred to any word object 108 that might have been identified.

Once the duplicate word objects 108 and the associated frequency objects 104 have been removed at 232, the remaining prefix objects are arranged, as at 236, in an output set in decreasing order of frequency value. The orphan prefix objects mentioned above may also be added to the output set, albeit at positions of relatively lower frequency value than any prefix object for which a corresponding word object 108 was found. It is also necessary to ensure that the artificial variants, if they have been created, are placed at a preferred position in the output set. It is understood that artificial variants may, but need not necessarily be, given a position of preference, i.e., assigned a relatively higher priority or frequency, than prefix objects of the result.

If it is determined, as at 240, that the flag has been set, meaning that a user has made a selection input, either through an express selection input or through an alternation input of a movement input, then the default output 76 is considered to be "locked," meaning that the selected variant will be the default prefix until the end of the session. If it is determined at 240 that the flag has been set, the processing will proceed to 244 where the contents of the output set will be altered, if needed, to provide as the default output 76 an output that includes the selected prefix object, whether it corresponds with a word object 108 or is an artificial variant. In this regard, it is understood that the flag can be set additional times during a session, in which case the selected prefix associated with resetting of the flag thereafter becomes the "locked" default output 76 until the end of the session or until another selection input is detected.

Processing then continues, as at 248, to an output step after which an output 64 is generated as described above. More specifically, processing proceeds, as at 250, to the subsystem depicted generally in FIG. 6 and described below. Processing thereafter continues at 204 where additional input is detected. On the other hand, if it is determined at 240 that the flag had not been set, then processing goes directly to 248 without the alteration of the contents of the output set at 244.

The handheld electronic device 4 may be configured such that any orphan prefix object that is included in an output 64 but that is not selected with the next input is suspended. This may be limited to orphan prefix objects appearing in the variant portion 80 or may apply to orphan prefix objects anywhere in the output 64. The handheld electronic device 4 may also be configured to similarly suspend artificial variants in similar circumstances. A reason for such suspension is that each such orphan prefix object and/or artificial variant, as appropriate, may spawn a quantity of offspring orphan prefix objects equal to the quantity of characters 48 on a key 28 of the next input. That is, each offspring will include the parent orphan prefix object or artificial variant plus one of the characters 48 of the key 28 of the next input. Since orphan prefix objects and artificial variants substantially do not have correspondence with a word object 108, spawned offspring objects from parent orphan prefix objects and artificial variants likewise will not have correspondence with a word object 108. Such suspended orphan prefix objects and/or artificial variants may be considered to be suspended, as compared with being wholly eliminated, since such suspended orphan prefix objects and/or artificial variants may reappear later as parents of a spawned orphan prefix objects and/or artificial variants, as will be explained below.

If the detected input is determined, as at 212, to be an operational input, processing then continues to determine the specific nature of the operational input. For instance, if it is determined, as at 252, that the current input is a selection input, processing continues at 254. At 254, the word object 108 and the associated frequency object 104 of the default portion 76 of the output 64, as well as the word object 108 and the associated frequency object 104 of the portion of the variant output 80 that was selected by the selection input, are stored in a temporary learning data register. Additionally, the flag is set. Processing then returns to detection of additional inputs as at 204.

Figure 5A:
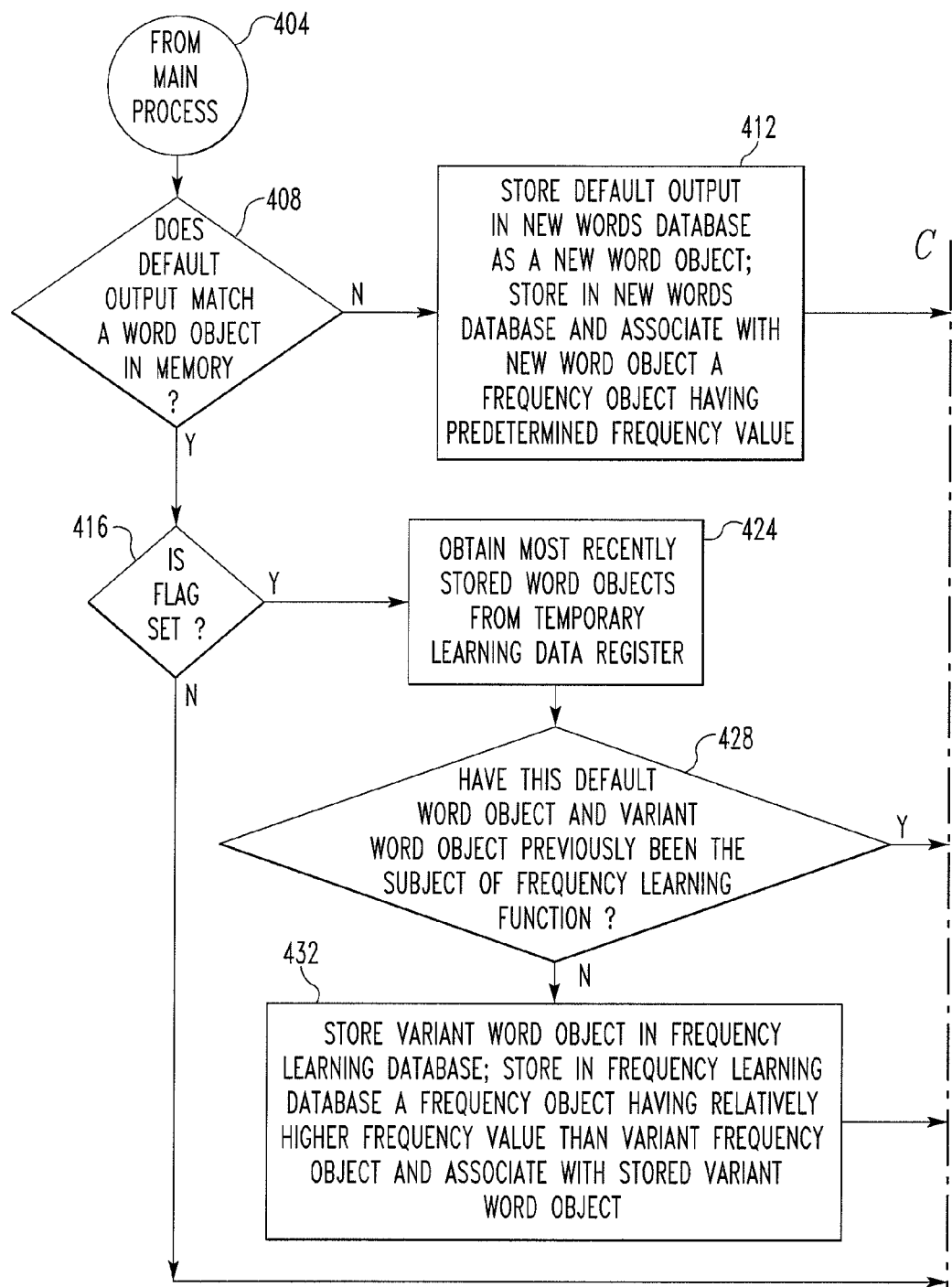
FIGS. 5A and 5B depict another exemplary flowchart depicting certain aspects of the learning method that can be executed on the handheld electronic device.

If it is determined, as at 260, that the input is a delimiter input, processing continues at 264 where the current session is terminated and processing is transferred, as at 266, to the learning function subsystem, as at 404 of FIG. 5A. A delimiter input would include, for example, the actuation of a <SPACE> key 116, which would both enter a delimiter symbol and would add a space at the end of the word, actuation of the <ENTER> key 44, which might similarly enter a delimiter input and enter a space, and by a translation of the thumbwheel 32, such as is indicated by the arrow 38, which might enter a delimiter input without additionally entering a space.

It is first determined, as at 408, whether the default output at the time of the detection of the delimiter input at 260 matches a word object 108 in the memory 20. If it does not, this means that the default output is a user-created output that should be added to the new words database 92 for future use. In such a circumstance processing then proceeds to 412 where the default output is stored in the new words database 92 as a new word object 108. Additionally, a frequency object 104 is stored in the new words database 92 and is associated with the aforementioned new word object 108. The new frequency object 104 is given a relatively high frequency value, typically within the upper one-fourth or one-third of a predetermined range of possible frequency values.

In this regard, frequency objects 104 are given an absolute frequency value generally in the range of zero to 65,535. The maximum value represents the largest number that can be stored within two bytes of the memory 20. The new frequency object 104 that is stored in the new words database 92 is assigned an absolute frequency value within the upper one-fourth or one-third of this range, particularly since the new word was used by a user and is likely to be used again.

With further regard to frequency object 104, it is noted that within a given data table, such as the "CO" data table mentioned above, the absolute frequency value is stored only for the frequency object 104 having the highest frequency value within the data table. All of the other frequency objects 104 in the same data table have frequency values stored as percentage values normalized to the aforementioned maximum absolute frequency value. That is, after identification of the frequency object 104 having the highest frequency value within a given data table, all of the other frequency objects 104 in the same data table are assigned a percentage of the absolute maximum value, which represents the ratio of the relatively smaller absolute frequency value of a particular frequency object 104 to the absolute frequency value of the aforementioned highest value frequency object 104. Advantageously, such percentage values can be stored within a single byte of memory, thus saving storage space within the handheld electronic device 4.

Upon creation of the new word object 108 and the new frequency object 104, and storage thereof within the new words database 92, processing is transferred to 420 where the learning process is terminated. Processing is then returned to the main process, as at 204.

If at 408 it is determined that the word object 108 in the default output 76 matches a word object 108 within the memory 20, processing then continues at 416 where it is determined whether the aforementioned flag has been set, such as occurs upon the detection of a selection input, and alternation input, or a movement input, by way of example. If it turns out that the flag has not been set, this means that the user has not expressed a preference for a variant prefix object over a default prefix object, and no need for frequency learning has arisen. In such a circumstance, processing continues at 420 where the learning process is terminated. Processing then returns to the main process at 254.

However, if it is determined at 416 that the flag has been set, the processor 20 retrieves from the temporary learning data register the most recently saved default and variant word objects 108, along with their associated frequency objects 104. It is then determined, as at 428, whether the default and variant word objects 108 had previously been subject of a frequency learning operation. This might be determined, for instance, by determining whether the variant word object 108 and the associated frequency object 104 were obtained from the frequency learning database 96. If the default and variant word objects 108 had not previously been the subject of a frequency learning operation, processing continues, as at 432, where the variant word object 108 is stored in the frequency learning database 96, and a revised frequency object 104 is generated having a frequency value greater than that of the frequency object 104 that previously had been associated with the variant word object 108. In the present exemplary circumstance, i.e., where the default word object 108 and the variant word object 108 are experiencing their first frequency learning operation, the revised frequency object 104 may, for instance, be given a frequency value equal to the sum of the frequency value of the frequency object 104 previously associated with the variant word object 108 plus one-half the difference between the frequency value of the frequency object 104 associated with the default word object 108 and the frequency value of the frequency object 104 previously associated with the variant word object 108. Upon storing the variant word object 108 and the revised frequency object 104 in the frequency learning database 96, processing continues at 420 where the learning process is terminated and processing returns to the main process, as at 254.

If it is determined at 428 that that default word object 108 and the variant word object 108 had previously been the subject of a frequency learning operation, processing continues to 436 where the revised frequency value 104 is instead given a frequency value higher than the frequency value of the frequency object 104 associated with the default word object 108. After storage of the variant word object 108 and the revised frequency object 104 in the frequency learning database 96, processing continues to 420 where the learning process is terminated, and processing then returns to the main process, as at 254.

With further regard to the learning function, it is noted that the learning function additionally detects whether both the default word object 108 and the variant word object 104 were obtained from the frequency learning database 96. In this regard, when word objects 108 are identified, as at 224, for correspondence with generated prefix objects, all of the data sources in the memory are polled for such corresponding word objects 108 and corresponding frequency objects 104. Since the frequency learning database 96 stores word objects 108 that also are stored either in the generic word list 88 or the new words database 96, the word object 108 and the associated frequency object 104 that are obtained from the frequency learning database 96 typically are duplicates of word objects 108 that have already been obtained from the generic word list 88 or the new words database 96. However, the associated frequency object 104 obtained from the frequency learning database 96 typically has a frequency value that is of a greater magnitude than that of the associated frequency object 104 that had been obtained from the generic word list 88. This reflects the nature of the frequency learning database 96 as imparting to a frequently used word object 108 a relatively greater frequency value than it otherwise would have in the generic word list 88.

Figure 5B:
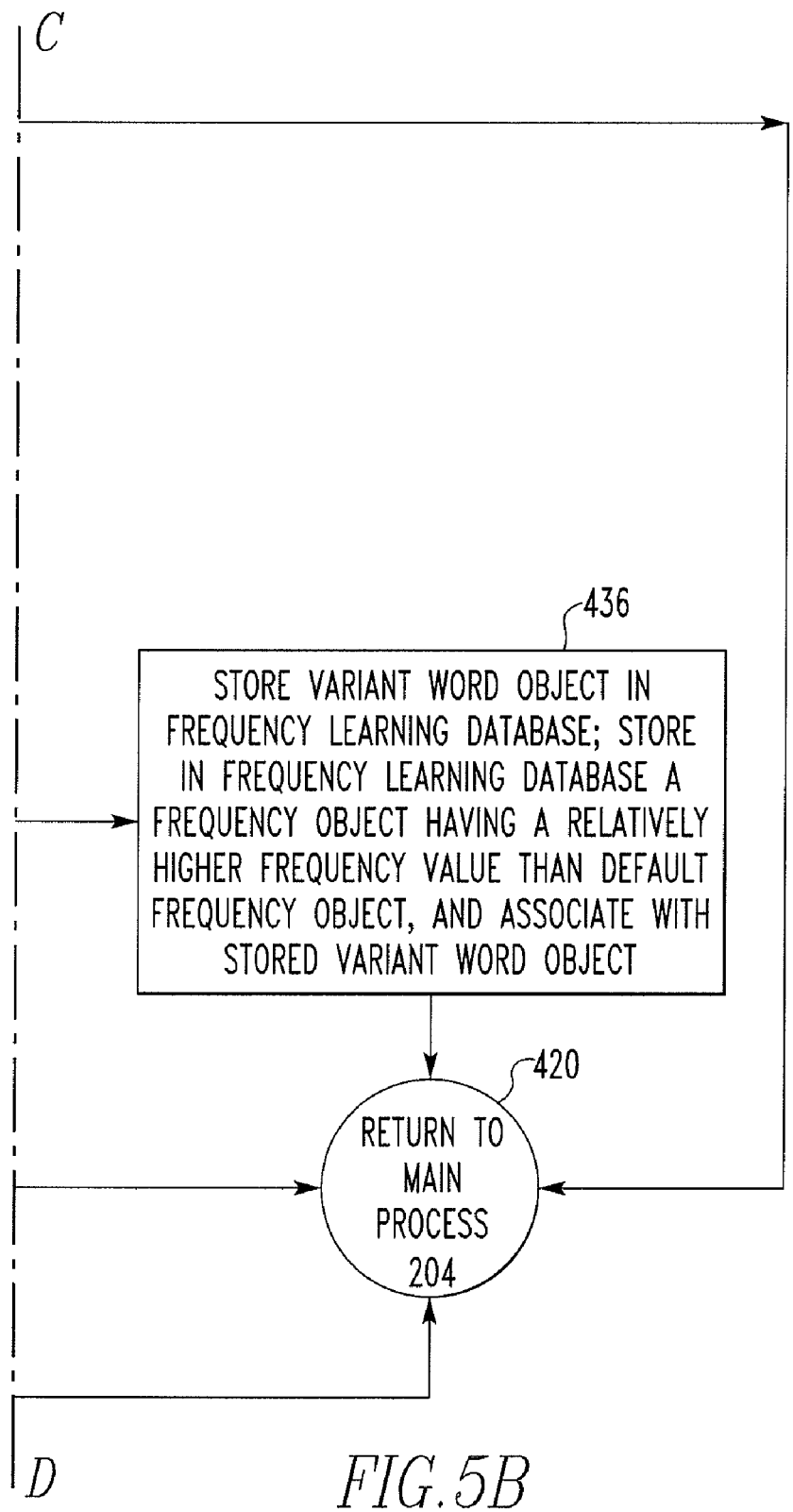

It thus can be seen that the learning function indicated in FIGS. 5A and 5B and described above is generally not initiated until a delimiter input is detected, meaning that learning occurs only once for each session. Additionally, if the final default output is not a user-defined new word, the word objects 108 that are the subject of the frequency learning function are the word objects 108 which were associated with the default output 76 and the selected variant output 80 at the time when the selection occurred, rather than necessarily being related to the object that ultimately resulted as the default output at the end of the session. Also, if numerous learnable events occurred during a single session, the frequency learning function operates only on the word objects 108 that were associated with the final learnable event, i.e., a selection event, an alternation event, or a movement event, prior to termination of the current session.

With further regard to the identification of various word objects 108 for correspondence with generated prefix objects, it is noted that the memory 22 can include a number of additional data sources 99 in addition to the generic word list 88, the new words database 92, and the frequency learning database 96, all of which can be considered linguistic sources. An exemplary other data source 99 is depicted in FIG. 2A, it being understood that the memory 22 might include any number of other data sources 99. The other data sources 99 might include, for example, an address database, a speed-text database, or any other data source without limitation. An exemplary speed-text database might include, for example, sets of words or expressions or other data that are each associated with, for example, a character string that may be abbreviated. For example, a speed-text database might associate the string "br" with the set of words "Best Regards", with the intention that a user can type the string "br" and receive the output "Best Regards".

In seeking to identify word objects 108 that correspond with a given prefix object, the handheld electronic device 4 may poll all of the data sources in the memory 22. For instance the handheld electronic device 4 may poll the generic word list 88, the new words database 92, the frequency learning database 96, and the other data sources 99 to identify word objects 108 that correspond with the prefix object. The contents of the other data sources 99 may be treated as word objects 108, and the processor 20 may generate frequency objects 104 that will be associated such word objects 108 and to which may be assigned a frequency value in, for example, the upper one-third or one-fourth of the aforementioned frequency range. Assuming that the assigned frequency value is sufficiently high, the string "br", for example, would typically be output to the display 60. If a delimiter input is detected with respect to the portion of the output having the association with the word object 108 in the speed-text database, for instance "br", the user would receive the output "Best Regards", it being understood that the user might also have entered a selection input as to the exemplary string "br".

The contents of any of the other data sources 99 may be treated as word objects 108 and may be associated with generated frequency objects 104 having the assigned frequency value in the aforementioned upper portion of the frequency range. After such word objects 108 are identified, the new word learning function can, if appropriate, act upon such word objects 108 in the fashion set forth above.

Again regarding FIG. 3A, when processing proceeds to the filtration step, as at 232, and the duplicate word objects 108 and the associated frequency objects 104 having relatively lower frequency values are filtered, the remaining results may include a variant word object 108 and a default word object 108, both of which were obtained from the frequency learning database 96. In such a situation, it can be envisioned that if a user repetitively and alternately uses one word then the other word, over time the frequency objects 104 associated with such words will increase well beyond the aforementioned maximum absolute frequency value for a frequency object 104. Accordingly, if it is determined that both the default word object 108 and the variant word object 108 in the learning function were obtained from the frequency learning database 96, instead of storing the variant word object 108 in the frequency learning database 96 and associating it with a frequency object 104 having a relatively increased frequency value, instead the learning function stores the default word object 108 and associates it with a revised frequency object 104 having a frequency value that is relatively lower than that of the frequency object 104 that is associated with the variant word object 108. Such a scheme advantageously avoids excessive and unnecessary increases in frequency value.

If it is determined, such as at 268, that the current input is a movement input, such as would be employed when a user is seeking to edit an object, either a completed word or a prefix object within the current session, the caret 84 is moved, as at 272, to the desired location, and the flag is set, as at 276. Processing then returns to where additional inputs can be detected, as at 204.

In this regard, it is understood that various types of movement inputs can be detected from the input device 8. For instance, a rotation of the thumbwheel 32, such as is indicated by the arrow 34 of FIG. 1, could provide a movement input, as could the actuation of the <NEXT> key 40, or other such input, potentially in combination with other devices in the input apparatus 8. In the instance where such a movement input is detected, such as in the circumstance of an editing input, the movement input is additionally detected as a selection input. Accordingly, and as is the case with a selection input such as is detected at 252, the selected variant is effectively locked with respect to the default portion 76 of the output 64. Any default output 76 during the same session will necessarily include the previously selected variant.

In the context of editing, however, the particular displayed object that is being edited is effectively locked except as to the character that is being edited. In this regard, therefore, the other characters of the object being edited, i.e., the characters that are not being edited, are maintained and are employed as a context for identifying additional word objects 108 and the like that correspond with the object being edited. Were this not the case, a user seeking to edit a letter in the middle of a word otherwise likely would see as a new output 64 numerous objects that bear little or no resemblance to the characters of the object being edited since, in the absence of maintaining such context, an entirely new set of prefix objects including all of the permutations of the characters of the various keystrokes of the object being edited would have been generated. New word objects 108 would have been identified as corresponding with the new prefix objects, all of which could significantly change the output 64 merely upon the editing of a single character. By maintaining the other characters currently in the object being edited, and employing such other characters as context information, the user can much more easily edit a word that is depicted on the display 60.

In the present exemplary embodiment of the handheld electronic device 4, if it is determined, as at 252, that the input is not a selection input, and it is determined, as at 260, that the input is not a delimiter input, and it is further determined, as at 268, that the input is not a movement input, in the current exemplary embodiment of the handheld electronic device 4 the only remaining operational input generally is a detection of the <DELETE> key 86 of the keys 28 of the keypad 24. Upon detection of the <DELETE> key 86, the final character of the default output is deleted, as at 280. At this point, the processing generally waits until another input is detected, as at 284. It is then determined, as at 288, whether the new input detected at 284 is the same as the most recent input that was related to the final character that had just been deleted at 280. If so, the default output 76 is the same as the previous default output, except that the last character is the opposite character of the key actuation that generated the last character. Processing then continues to 292 where learning data, i.e., the word object 108 and the associate frequency object 104 associated with the previous default output 76, as well as the word object 108 and the associate frequency object 104 associated with the new default output 76, are stored in the temporary learning data register and the flag is set. Such a key sequence, i.e., an input, the <DELETE> key 86, and the same input as before, is an alternation input. Such an alternation input replaces the default final character with an opposite final character of the key 28 which generated the final character 48 of the default output 76. The alternation input is treated as a selection input for purposes of locking the default output 76 for the current session, and also triggers the flag which will initiate the learning function upon detection of a delimiter input at 260.

If it turns out, however, that the system detects at 288 that the new input detected at 284 is different than the input immediately prior to detection of the <DELETE> key 86, processing continues at 212 where the input is determined to be either an operational input or an input of a key having one or more characters 48, and processing continues thereafter.

It is also noted that when the main process reaches the output stage at 248, an additional process is initiated which determines whether the variant component 72 of the output 64 should be initiated. Processing of the additional function is initiated from 248 at element 504 of FIG. 6. Initially, the method at 508 outputs the text component 68 of the output 64 to the display 60. Further processing determines whether or not the variant component 72 should be displayed.

Specifically, it is determined, as at 512, whether the variant component 72 has already been displayed during the current session. If the variant component 72 has already been displayed, processing continues at 516 where the new variant component 72 resulting from the current disambiguation cycle within the current session is displayed. Processing then returns to a termination point at 520, after which processing returns to the main process at 204. If, however, it is determined at 512 that the variant component 72 has not yet been displayed during the current session, processing continues, as at 524, to determine whether the elapsed time between the current input and the immediately previous input is longer than a predetermined duration. If it is longer, then processing continues at 516 where the variant component 72 is displayed and processing returns, through 520, to the main process, as at 204. However, if it is determined at 524 that the elapsed time between the current input and the immediately previous input is less than the predetermined duration, the variant component 72 is not displayed, and processing returns to the termination point at 520, after which processing returns to the main process, as at 204.

Advantageously, therefore, if a user is entering keystrokes relatively quickly, the variant component 72 will not be output to the display 60, where it otherwise would likely create a visual distraction to a user seeking to enter keystrokes quickly. If at any time during a given session the variant component 72 is output to the display 60, such as if the time between successive inputs exceeds the predetermined duration, the variant component 72 will continue to be displayed throughout that session. However, upon the initiation of a new session, the variant component 72 will be withheld from the display if the user consistently is entering keystrokes relatively quickly.

As mentioned above, in certain circumstances certain data sources can be searched prior to other data sources if the input field is determined, as at 222, to be special. For instance, if the input field is to have a particular type of data input therein, and this particular type of data can be identified and obtained, the disambiguated results will be of a greater degree of relevance to the field and have a higher degree of correspondence with the intent of the user. For instance, a physician's prescription pad typically includes blank spaces into which are inserted, for instance, a patient's name, a drug name, and instructions for administering the drug. The physician's prescription pad potentially could be automated as an application on the device 4. During entry of the patient's name, the data source 99 that would most desirably be searched first would be, for instance, a data source 99 listing the names and, for instance, the contact information for the doctor's patients. Similarly, during entry of the drug name, the data source 99 that would most desirably be searched first would be the data source 99 listing, for instance, names of drugs. By searching these special data sources first, the relevance of the proposed disambiguated results is higher since the results are more likely to be what is intended by the user. If the method obtains an insufficient quantity of results in such a fashion, however, additional results can be obtained in the usual fashion from the other data sources.

Figure 6:
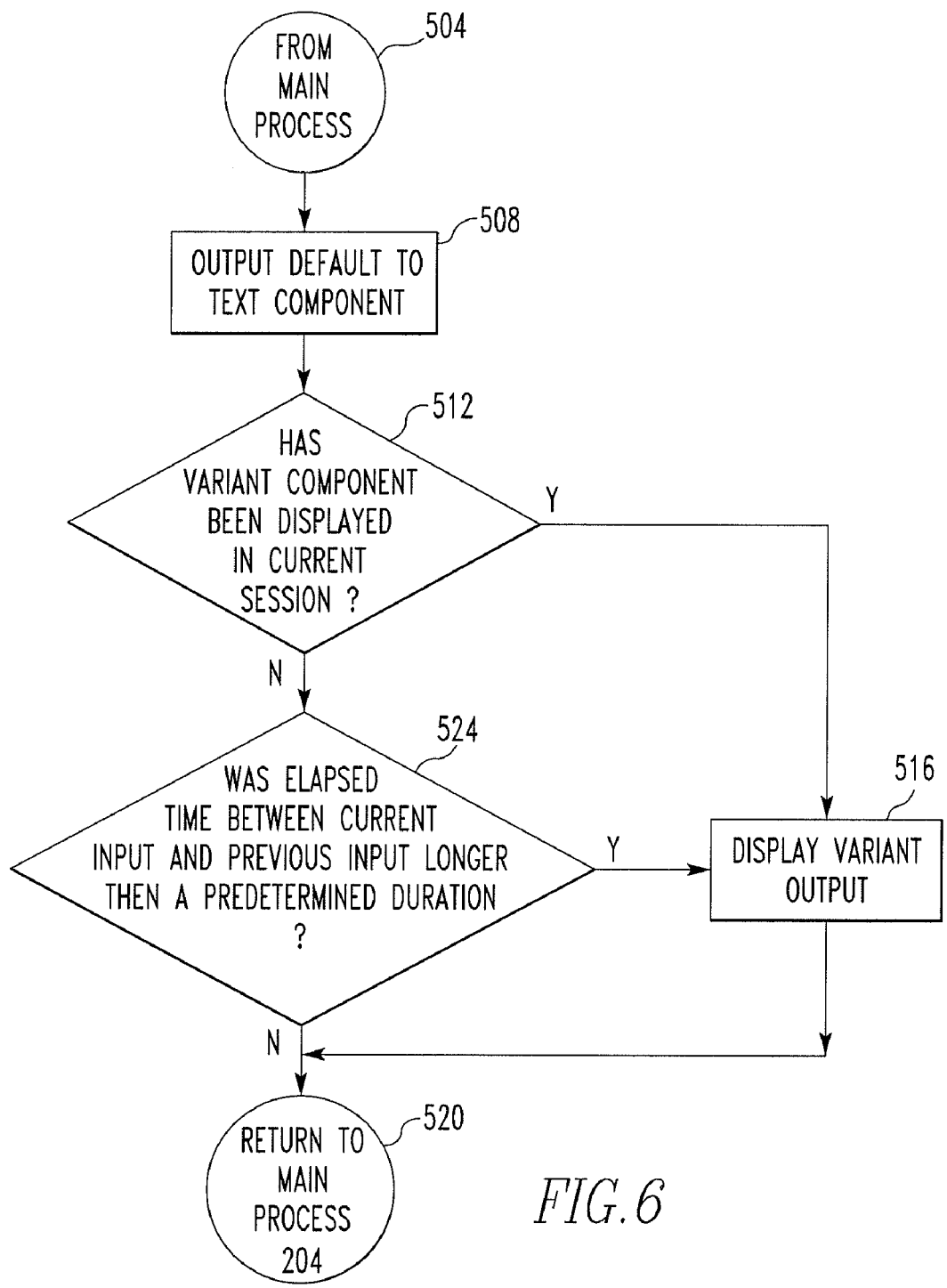
FIG. 6 is another exemplary flowchart depicting certain aspects of a method by which various display formats that can be provided on the handheld electronic device.
Figure 6A:
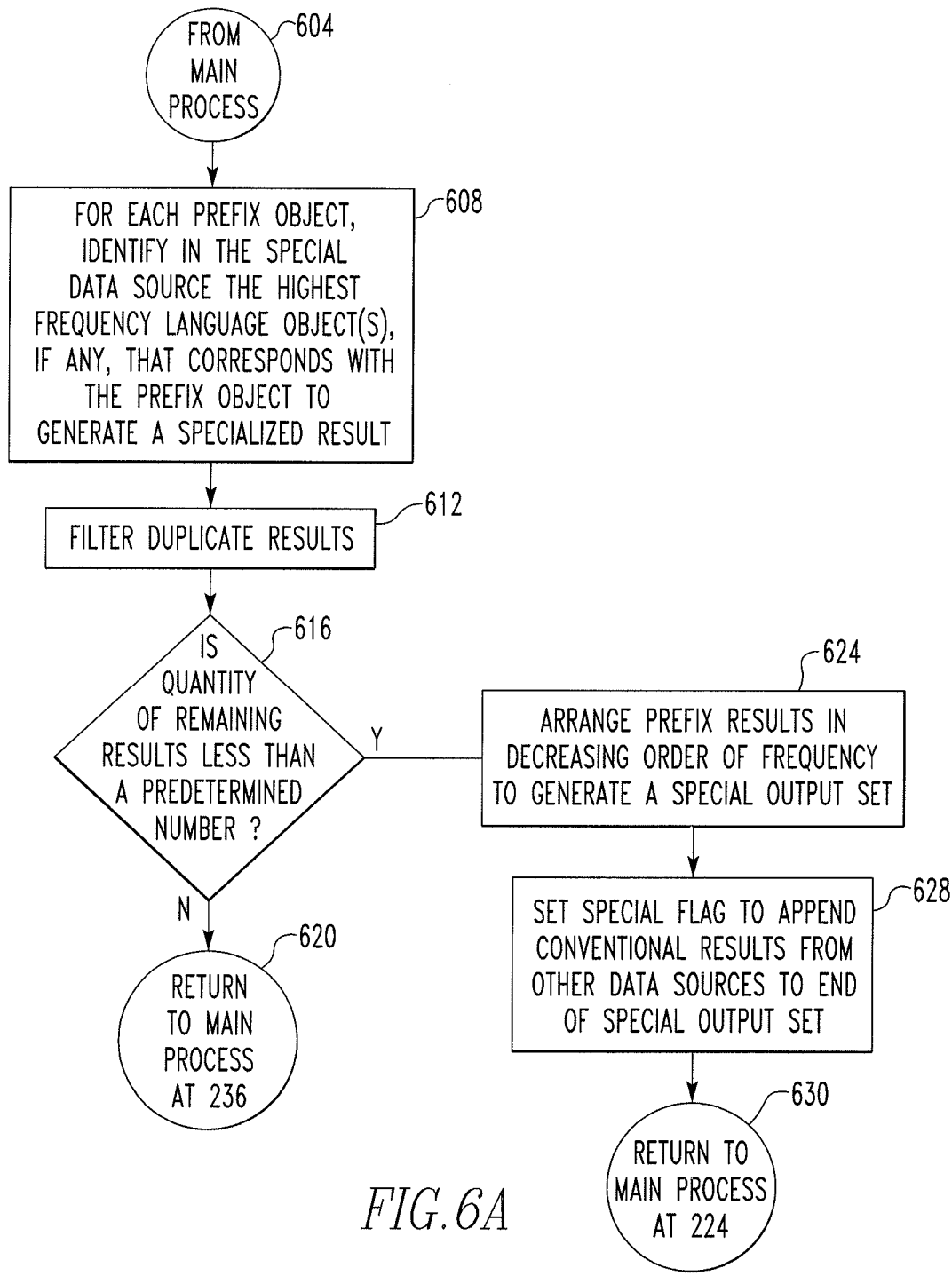
FIG. 6A is another exemplary flowchart depicting certain aspects of the method that can be executed on the handheld electronic device.

As can be seen in FIG. 6A, after processing is transferred to 604 from the main process, the method searches, as at 608, for word objects 108 and frequency objects 104 in whatever data source 99 is determined to correspond with or have some relevance to the special input field. The input field typically will inform the operating system of the device 4 that it typically receives a particular type of input, and the operating system will determine which data source 99 will be searched first in seeking disambiguation results.

The disambiguation results obtained from the special, i.e., predetermined, data source 99 are then filtered, as at 612, to eliminate duplicate results, and the quantity of remaining results are then counted, as at 616, to determine whether the quantity is less than a predetermined number. If the answer to this inquiry is "no", meaning that a sufficient quantity of results were obtained from the particular data source 99, processing is transferred, as at 620, to the main process at 236.

On the other hand, if it is determined at 616 that insufficient disambiguation results were obtained from the predetermined data source 99, additional results typically will desirably be obtained. For instance, in such a circumstance processing continues, as at 624, to processing at which the prefix results are arranged in order of decreasing frequency value into a special output set. A special flag is set, as at 628, that indicates to the method that the additional disambiguation results that are about to be obtained from the other data sources of the device 4 are to be appended to the end of the special output set. Processing is transferred, as at 630, back to the main process at 224, after which additional disambiguation results will be sought from the other data sources on the device 4. With the special flag being set, as at 628, the results that were obtained from the predetermined data source are to be listed ahead of the additional results obtained from the remaining data sources, even if the additional results are associated with relatively higher frequency values than some of the results from the predetermined data source. The method could, however, be applied in different fashion without departing from the concept of the invention.

An exemplary input sequence is depicted in FIGS. 1 and 7-11. In this example, the user is attempting to enter the word "APPLOADER", and this word presently is not stored in the memory 20. In FIG. 1 the user has already typed the "AS" key 28. Since the data tables in the memory 20 are organized according to two-letter prefixes, the contents of the output 64 upon the first keystroke are obtained from the N-gram objects 112 within the memory. The first keystroke "AS" corresponds with a first N-gram object 112 "S" and an associated frequency object 104, as well as another N-gram object 112 "A" and an associated frequency object 104. While the frequency object 104 associated with "S" has a frequency value greater than that of the frequency object 104 associated with "A", it is noted that "A" is itself a complete word. A complete word is always provided as the default output 76 in favor of other prefix objects that do not match complete words, regardless of associated frequency value. As such, in FIG. 1, the default portion 76 of the output 64 is "A".

In FIG. 7, the user has additionally entered the "OP" key 28. The variants are depicted in FIG. 7. Since the prefix object "SO" is also a word, it is provided as the default output 76. In FIG. 8, the user has again entered the "OP" key 28 and has also entered the "L" key 28. It is noted that the exemplary "L" key 28 depicted herein includes only the single character 48 "L".

It is assumed in the instant example that no operational inputs have thus far been detected. The default output 76 is "APPL", such as would correspond with the word "APPLE". The prefix "APPL" is depicted both in the text component 68, as well as in the default portion 76 of the variant component 72. Variant prefix objects in the variant portion 80 include "APOL", such as would correspond with the word "APOLOGIZE", and the prefix "SPOL", such as would correspond with the word "SPOLIATION".

It is particularly noted that the additional variants "AOOL", "AOPL", "SOPL", and "SOOL" are also depicted as variants 80 in the variant component 72. Since no word object 108 corresponds with these prefix objects, the prefix objects are considered to be orphan prefix objects for which a corresponding word object 108 was not identified. In this regard, it may be desirable for the variant component 72 to include a specific quantity of entries, and in the case of the instant exemplary embodiment the quantity is seven entries. Upon obtaining the result at 224, if the quantity of prefix objects in the result is fewer than the predetermined quantity, the disambiguation function will seek to provide additional outputs until the predetermined number of outputs are provided. In the absence of artificial variants having been created, the additional variant entries are provided by orphan prefix objects. It is noted, however, that if artificial variants had been generated, they likely would have occupied a place of preference in favor of such orphan prefix objects, and possibly also in favor of the prefix objects of the result.

It is further noted that such orphan prefix objects may actually be offspring orphan prefix objects from suspended parent orphan prefix objects and/or artificial variants. Such offspring orphan prefix objects can be again output depending upon frequency ranking as explained below, or as otherwise ranked.

The orphan prefix objects are ranked in order of descending frequency with the use of the N-gram objects 112 and the associated frequency objects 104. Since the orphan prefix objects do not have a corresponding word object 108 with an associated frequency object 104, the frequency objects 104 associated with the various N-gram objects 112 must be employed as a fallback.

Using the N-gram objects 112, the disambiguation function first seeks to determine if any N-gram object 112 having, for instance, three characters is a match for, for instance, a final three characters of any orphan prefix object. The example of three characters is given since the exemplary embodiment of the handheld electronic device 4 includes N-gram objects 112 that are an exemplary maximum of the three characters in length, but it is understood that if the memory 22 included N-gram objects four characters in length or longer, the disambiguation function typically would first seek to determine whether an N-gram object having the greatest length in the memory 22 matches the same quantity of characters at the end of an orphan prefix object.

If only one prefix object corresponds in such a fashion to a three character N-gram object 112, such orphan prefix object is listed first among the various orphan prefix objects in the variant output 80. If additional orphan prefix objects are matched to N-gram objects 112 having three characters, then the frequency objects 104 associated with such identified N-gram objects 112 are analyzed, and the matched orphan prefix objects are ranked amongst themselves in order of decreasing frequency.

If it is determined that a match cannot be obtained with an N-gram object 112 having three characters, then two-character N-gram objects 112 are employed. Since the memory 20 includes all permutations of two-character N-gram objects 112, a last two characters of each orphan prefix object can be matched to a corresponding two-character N-gram object 112. After such matches are achieved, the frequency objects 104 associated with such identified N-gram objects 112 are analyzed, and the orphan prefix objects are ranked amongst themselves in descending order of frequency value of the frequency objects 104 that were associated with the identified N-gram objects 112. It is further noted that artificial variants can similarly be rank ordered amongst themselves using the N-gram objects 112 and the associated frequency objects 104.

In FIG. 9 the user has additionally entered the "OP" key 28. In this circumstance, and as can be seen in FIG. 9, the default portion 76 of the output 64 has become the prefix object "APOLO" such as would correspond with the word "APOLOGIZE," whereas immediately prior to the current input the default portion 76 of the output 64 of FIG. 8 was "APPL" such as would correspond with "APPLE." Again, assuming that no operational inputs had been detected, the default prefix object in FIG. 9 does not correspond with the previous default prefix object of FIG. 8. As such, the first artificial variant "APOLP" is generated and in the current example is given a preferred position. The aforementioned artificial variant "APOLP" is generated by deleting the final character of the default prefix object "APOLO" and by supplying in its place an opposite character 48 of the key 28 which generated the final character of the default portion 76 of the output 64, which in the current example of FIG. 9 is "P," so that the aforementioned artificial variant is "APOLP."

Furthermore, since the previous default output "APPL" corresponded with a word object 108, such as the word object 108 corresponding with the word "APPLE", and since with the addition of the current input the previous default output "APPL" no longer corresponds with a word object 108, two additional artificial variants are generated. One artificial variant is "APPLP" and the other artificial variant is "APPLO", and these correspond with the previous default output "APPL" plus the characters 48 of the key 28 that was actuated to generate the current input. These artificial variants are similarly output as part of the variant portion 80 of the output 64.

As can be seen in FIG. 9, the default portion 76 of the output 64 "APOLO" no longer seems to match what would be needed as a prefix for "APPLOADER", and the user likely anticipates that the desired word "APPLOADER" is not already stored in the memory 20. As such, the user provides a selection input, such as by scrolling with the thumbwheel 32, or by actuating the <NEXT> key 40, until the variant string "APPLO" is highlighted. The user then continues typing and enters the "AS" key.

The output 64 of such action is depicted in FIG. 10. Here, the string "APPLOA" is the default portion 76 of the output 64. Since the variant string "APPLO" became the default portion 76 of the output 64 (not expressly depicted herein) as a result of the selection input as to the variant string "APPLO", and since the variant string "APPLO" does not correspond with a word object 108, the character strings "APPLOA" and "APPLOS" were created as an artificial variants. Additionally, since the previous default of FIG. 9, "APOLO" previously had corresponded with a word object 108, but now is no longer in correspondence with the default portion 76 of the output 64 of FIG. 10, the additional artificial variants of "APOLOA" and "APOLOS" were also generated. Such artificial variants are given a preferred position in favor of the three displayed orphan prefix objects.

Since the current input sequence in the example no longer corresponds with any word object 108, the portions of the method related to attempting to find corresponding word objects 108 are not executed with further inputs for the current session. That is, since no word object 108 corresponds with the current input sequence, further inputs will likewise not correspond with any word object 108. Avoiding the search of the memory 20 for such nonexistent word objects 108 saves time and avoids wasted processing effort.

As the user continues to type, the user ultimately will successfully enter the word "APPLOADER" and will enter a delimiter input. Upon detection of the delimiter input after the entry of "APPLOADER", the learning function is initiated. Since the word "APPLOADER" does not correspond with a word object 108 in the memory 20, a new word object 108 corresponding with "APPLOADER" is generated and is stored in the new words database 92, along with a corresponding new frequency object 104 which is given an absolute frequency in the upper, say, one-third or one-fourth of the possible frequency range. In this regard, it is noted that the new words database 92 and the frequency learning database 96 are generally organized in two-character prefix data tables similar to those found in the generic word list 88. As such, the new frequency object 104 is initially assigned an absolute frequency value, but upon storage the absolute frequency value, if it is not the maximum value within that data table, will be changed to include a normalized frequency value percentage normalized to whatever is the maximum frequency value within that data table.

As a subsequent example, in FIG. 11 the user is trying to enter the word "APOLOGIZE". The user has entered the key sequence "AS" "OP" "OP" "L" "OP". Since "APPLOADER" has now been added as a word object 108 to the new words database 92 and has been associated with frequency object 104 having a relatively high frequency value, the prefix object "APPLO" which corresponds with "APPLOADER" has been displayed as the default portion 76 of the output 64 in favor of the variant prefix object "APOLO", which corresponds with the desired word "APOLOGIZE." Since the word "APOLOGIZE" corresponds with a word object 108 that is stored at least in the generic word list 88, the user can simply continue to enter keystrokes corresponding with the additional letters "GIZE", which would be the letters in the word "APOLOGIZE" following the prefix object "APOLO", in order to obtain the word "APOLOGIZE". Alternatively, the user may, upon seeing the output 64 depicted in FIG. 11, enter a selection input to affirmatively select the variant prefix object "APOLO". In such a circumstance, the learning function will be triggered upon detection of a delimiter symbol, and the word object 108 that had corresponded with the character string "APOLO" at the time the selection input was made will be stored in the frequency learning database 92 and will be associated with a revised frequency object 104 having a relatively higher frequency value that is similarly stored in the frequency learning database 92.

An additional feature of the handheld electronic device 4 is depicted generally in FIG. 12. In some circumstances, it is desirable that the disambiguation function be disabled. For instance, when it is desired to enter a password, disambiguation typically is relatively more cumbersome than during ordinary text entry. As such, when the system focus is on the component corresponding with the password field, the component indicates to the API that special processing is requested, and the API disables the disambiguation function and instead enables, for instance, a multi-tap input interpretation system. Alternatively, other input interpretation systems could include a chording system or a press-and-hold/press-and-release interpretation system. As such, while an input entered with the disambiguation function active is an ambiguous input, by enabling the alternative interpretation system, such as the exemplary multi-tap system, each input can be largely unambiguous.

As can be understood from FIG. 12, each unambiguous input is displayed for a very short period of time within the password field 120, and is then replaced with another output, such as the asterisk. The character "R" is shown displayed, it being understood that such display is only for a very short period of time.

As can be seen in FIGS. 1 and 7-11, the output 64 includes the displayed graphic 46 near the lower end of the variant component 72, and that the displayed graphic 46 is highly similar to the graphic 42 of the <NEXT> key 40. Such a depiction provides an indication to the user which of the keys 28 of the keypad 24 can be actuated to select a variant output. The depiction of the displayed graphic 46 provides an association between the output 64 and the <NEXT> key 40 in the user's mind. Additionally, if the user employs the <NEXT> key 40 to provide a selection input, the user will be able to actuate the <NEXT> key 40 without moving the user's hands away from the position the hands were in with respect to the housing 6 during text entry, which reduces unnecessary hand motions, such as would be required if a user needed to move a hand to actuate the thumbwheel 32. This saves time and effort.

It is also noted that the system can detect the existence of certain predefined symbols as being delimiter signals if no word object 108 corresponds with the text entry that includes the symbol. For instance, if the user desired to enter the input "one-off", the user might begin by entering the key sequence "OP" "BN" "ER" "ZX" "OP", with the "ZX" actuation being intended to refer to the hyphen symbol disposed thereon. Alternatively, instead of typing the "ZX" key the user might actuate an <ALT> entry to unambiguously indicate the hyphen.

Assuming that the memory 20 does not already include a word object 108 of "one-off", the disambiguation function will detect the hyphen as being a delimiter input. As such, the key entries preceding the delimiter input will be delimited from the key entries subsequent to the delimiter input. As such, the desired input will be searched as two separate words, i.e., "ONE" and "OFF", with the hyphen therebetween. This facilitates processing by more narrowly identifying what is desired to be searched.

It is noted that layout of the characters 48 disposed on the keys 28 in FIG. 1 is an exemplary character layout that would be employed where the intended primary language used on the handheld electronic device 4 was, for instance, English. Other layouts involving these characters 48 and/or others can be used depending upon the intended primary language and any language bias in the makeup of the language objects 100.

Figure 13:
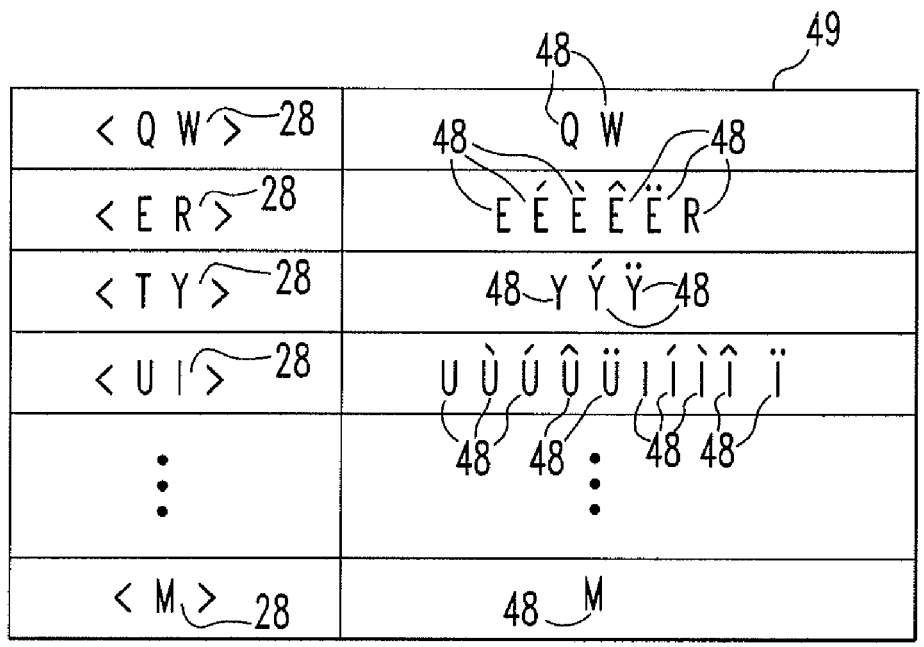
FIG. 13 is an exemplary depiction of a map file stored on the handheld electronic device.

The map file 49 depicted in FIG. 2A is depicted in greater detail in FIG. 13. The map file 49 is a table that includes an indication of the keys 28 and the characters 48 assigned thereto. As can be seen in FIG. 13, many of the keys 28 have characters 48 assigned thereto in addition to those characters 48 that are depicted in FIG. 1 as being disposed on the keys 28. For example, the map file 49 indicates that the <UI> key 28 has assigned thereto the letters "U" and "I", and such letters are indicated in FIG. 1 as being characters 48 disposed on the <UI> key 28. FIG. 13 further indicates that the <UI> key 28 additionally has assigned thereto the characters 48 Ù, Ú, Û, Ü, Í, Ì, Î, and Ï. It is noted that for the sake of simplicity the characters 48 are depicted in FIGS. 13-16 as being capital letter characters. It is further noted, however, that the characters 48 could additionally include lower case letter characters or other characters without departing from the present concept.

While the keys 28 have assigned thereto the characters 48 depicted in the map file 49, not all of the characters 48 necessarily are active on the handheld electronic device 4. That is, even though the characters 48 U, I, Ù, Ú, Û, Ü, Í, Ì, Î, and Ï are assigned to the <UI> key 28, not all of these characters 48 are automatically employed in, for instance, the generation of prefix objects for the purpose of disambiguating an ambiguous input. An active character 48 is a character 48 that is assigned to a key 28 and that is automatically considered by the processor apparatus 14 to be a possible intended result of actuating the key 28 during a text entry procedure.

Figure 14:
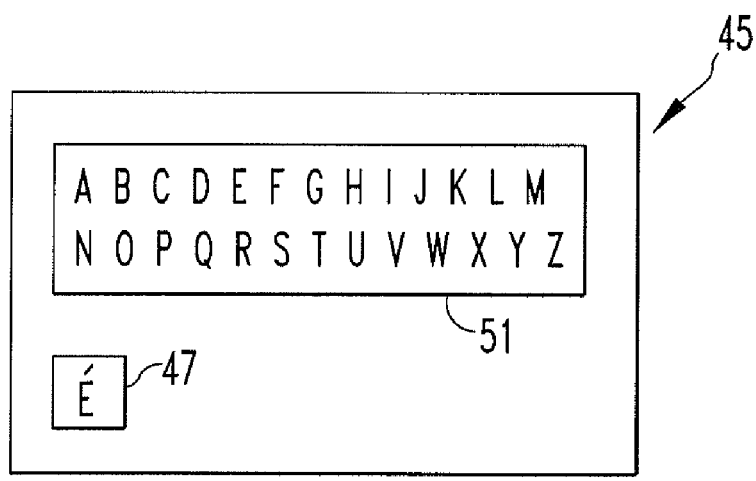
FIG. 14 is an exemplary depiction of an alphabet stored on the handheld electronic device.

The characters 48 that are active on the handheld electronic device 4 are included in an alphabet 45, such as is depicted in FIG. 14, that is stored in the memory 20. In the present exemplary embodiment, the alphabet 45 includes a static portion 51 that is stored as a part of the generic word list 88 and a modifiable portion 47 that is stored as a part of the new words database 92. The modifiable portion 47 of the alphabet 45 is advantageously configured to allow the addition to the alphabet of characters 48 from the map file 49 that are not, for instance, already included in the static portion 51 of the alphabet 45.

It can be seen that at least some of the characters 48 in the map file 49 are in the alphabet 45. As a general matter, the language objects 100 stored in the memory 20 are comprised of characters 48 in the alphabet 45.

Upon the detection of an ambiguous input, the processor apparatus 14 consults the map file 49 to identify the set of characters 48 that are assigned to the keys 28 of the ambiguous input. The set of characters 48 from the map file 49 are then compared with the alphabet 45 to identify the characters 48 in the set that are also in the alphabet 45. Stated otherwise, the map file 49 provides a listing of all of the characters 48 assigned to the keys 28 of the ambiguous input, and the alphabet 45 allows the identification of the characters 48 that are active on the handheld electronic device 4. In comparing the set of characters 48 from the map file 49 with those of the alphabet 45, the set of characters 48 typically will be compared with both the static portion 51 and the modifiable portion 47 of the alphabet 45 to obtain all active characters 48.

As a general matter, the static portion 51 is unchangeable and reflects the various characters 48 of which the language objects 100 in the generic word list 88 are comprised. The static portion 51 thus is indicative of the various characters 48 that typically would be considered to be valid characters in the language of the generic word list 88. For instance, the language of the generic word list 88 may be English, such as might be indicated by a relatively large proportion of English words being reflected as language objects 100 stored in the generic word list 88. The resultant static portion 51 of the alphabet 45 thus might comprise the twenty-six Latin letters.

The modifiable portion 47 of the alphabet 45 generally reflects the additional characters 48 that are not already a part of the static portion 51 and that, for instance, comprise the characters 48 in one or more of the language objects 100 in, for instance, the new words database 92. In the exemplary alphabet 45 depicted in FIG. 14, the modifiable portion 47 thereof is indicated as including the character 48 "É". For instance, the user may have previously entered the new language object 100 "SOUFFLÉ". Upon entry of the new language object 100 "SOUFFLÉ", the character 48 "É" would have been added to the modifiable portion 47 of the alphabet 45. In such a fashion, the character 48 "É" has been made an active character 48 on the handheld electronic device 4.

An exemplary text entry procedure is indicated in FIGS. 15A-15D. If it assumed that the alphabet 45 is that depicted generally in FIG. 14, an ordinary actuation, i.e., a press-and-release actuation, of the key 28 <UI> will result in an output such as that depicted generally in FIG. 15A. That is, the character 48 "I" will be displayed as a text component 68 and as a default portion 76 of a variant component 72. The character 48 "U" is depicted as being the variant portion 80 of the variant component 72.

Figure 15A:
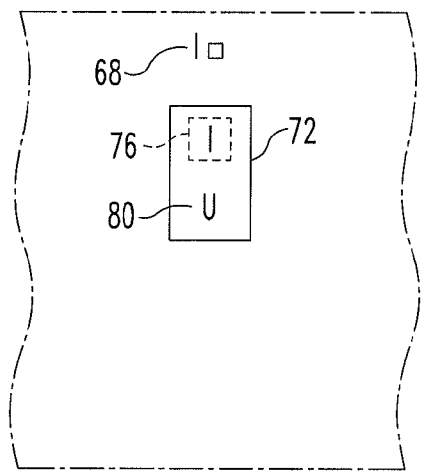
FIG. 15A is an exemplary output during another text entry operation.

If the user is seeking to enter the language object 100 "ÜBER", neither of the characters 48 "I" and "U" in the variant component 72 of FIG. 15A will be an acceptable first character. The user can, however, display the set of characters 48 from the map file 49 that are assigned to the key 28 <UI> by actuating the key 28 <UI> with a press-and-hold actuation and by performing a scrolling operation with the thumbwheel 32. Such an output is depicted generally in FIG. 15B, it being noted that only a portion of the set of characters 48 is depicted in the variant component 72, with the graphic 46 being depicted in the variant component 72 as indicating the existence of additional variants in the forms of other characters 48 from the map file 49 that are assigned to the key 28 <UI>.

Figure 15B:
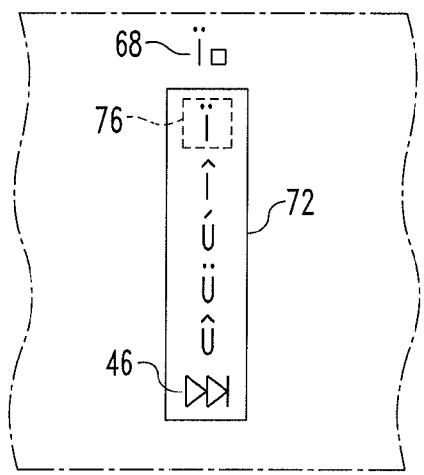
FIG. 15B is another exemplary output during another part of the another text entry operation.
Figure 15C:
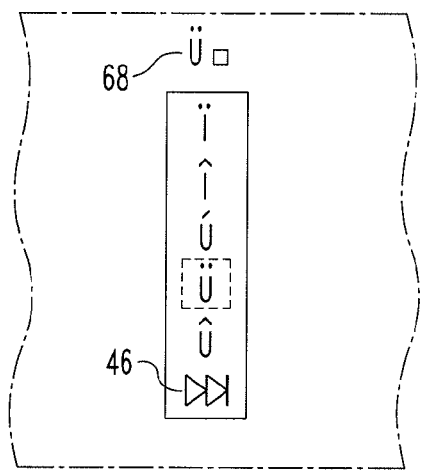
FIG. 15C is another exemplary output during another part of the another text entry operation.

In FIG. 15B, the character 48 "Ï" is depicted as being the default portion 76 of the variant component 72, and is additionally depicted as being the text component 68. FIG. 15C depicts that the user has entered a navigational input, such as by scrolling the thumbwheel 32 or actuating the <NEXT> 40 sufficiently that the character 48 "Ü" is highlighted and is displayed as the text component 68.

In order the complete the entry of the new language object 100 "ÜBER", the user will thereafter need to actuate the keys 28 <BN>, <ER>, and <ER>, although since a language object 100 for the word "ÜBER" is not already stored in the memory 20, the user likely will have to expressly enter the additionally characters 48 of "ÜBER", such as with the use of scrolling among the variants 80 after some of the keystrokes. Upon entry, for example, of the new language object "ÜBER", the character 48 "Ü" is added to the modifiable portion 47 of the alphabet 45, as is depicted generally in FIG. 16, and a language object 100 for "ÜBER" has been added to the new words database 92.

The character 48 "Ü" has thus been made an active character 48 on the handheld electronic device 4. Accordingly, future entry of the word "ÜBER" will advantageously be much easier for the user since "Ü" has been made an active character 48 on the handheld electronic device 4 and thus will automatically be employed by the processor apparatus 14 in seeking to disambiguate an ambiguous input, and since a language object 100 for "ÜBER" has been stored in the memory 20.

If it is thereafter decided by the user to enter another new language object 100 comprising the character 48 "Ü", such as if the user desired to enter the word "MÜNCHEN", the user would begin the entry by actuating the keys 28 <M>, <UI>. The output in response to such an ambiguous input would be that depicted generally in FIG. 15D, it being assumed that the alphabet 45 is in the condition depicted in FIG. 16. That is, the disambiguation routine will have employed the character 48 "M" that is active on the key 28 <M> and the characters 48 "I", "U", and "Ü" that are active on the key 28 <UI> to generate the prefix objects "MI", "MU", and "MÜ". Since the character 48 "Ü" is active on the key 28 <UI>, the character "Ü" was automatically employed by the disambiguation routine in generating prefix objects in response to the ambiguous input represented in FIG. 15D.

Figure 15D:
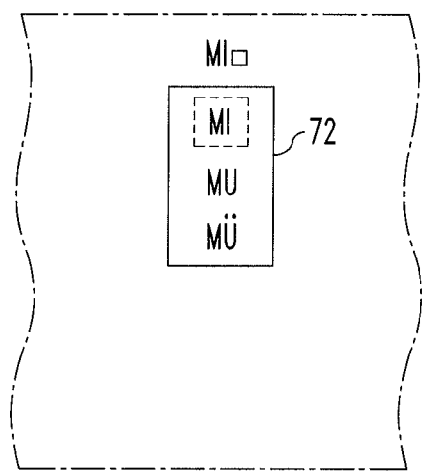
FIG. 15D is another exemplary output during another part of the another text entry operation.
Figure 16:
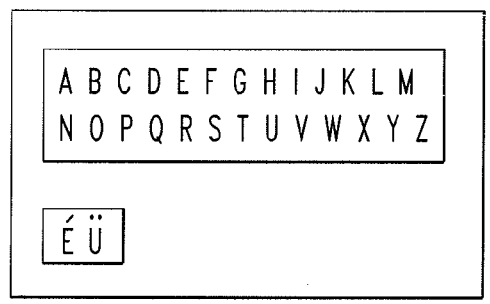
FIG. 16 is an exemplary depiction of an alphabet stored on the handheld electronic device.

In generating the output depicted generally in FIG. 15D, the disambiguation routine may have determined, for instance, that the prefix "MI" corresponded with the language object 100 for "MINE", and that the prefix object "MU" corresponded with the language object 100 for the word "MUCH". The various prefix objects are output in the variant component 72 in order of descending frequency value. If no language object 100 was identified as corresponding with the prefix object "MÜ", the prefix object "MÜ" still may be output, as it is in FIG. 15D, as an artificial variant at a position of relatively lower priority than the prefix objects for which corresponding language object 100 were identified. If it is assumed that the language object 100 for "ÜBER" is the only language object 100 in the new words database 92 that comprises the character "Ü", the variant "MÜ" will have been output in FIG. 15D as being an artificial variant.

It thus can be seen that the handheld electronic device 4 is configured to allow dynamic expansion of the set of characters 48 that are active thereon to enable the entry of new language objects 100 having characters 48 that are not already active on the handheld electronic device 4. This allows enhanced utility and customizability to the needs of the user.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of enabling input on an electronic device having stored therein a plurality of objects comprising a plurality of characters, at least some of the characters being in an active character set and others at least initially being in an inactive character set, the method comprising:
    detecting an input of a particular character in the inactive character set and not included in the active character set;
    updating the active character set to include the particular character as part of the active character set;
    detecting an ambiguous text input; and
    employing the updated active character set in disambiguating the ambiguous text input.

2. The method of claim 1, further comprising outputting the particular character as at least a portion of an interpretation of the ambiguous text input.

3. The method of claim 1 wherein the number of objects further comprise a number of language objects stored in at least a first dictionary, and further comprising:
    detecting the input of the particular character as being a part of a new language object not already stored on the electronic device; and
    storing the new language object in the at least first dictionary.

4. The method of claim 3, further comprising outputting a number of interpretations of the ambiguous input, at least some of the interpretations each comprising at least an initial number of the characters of a language object of the number of language objects, at least one of the interpretations comprising the particular character and being an artificial variant that does not correspond with a language object.

5. The method of claim 4, further comprising outputting the artificial variant at a location of relatively lower priority than the at least some of the interpretations.

6. The method of claim 1 wherein the active character set comprise a static portion and a modifiable portion, and wherein the storing of the particular character comprises adding the particular character to the modifiable portion of the active character set.

7. The method of claim 1 wherein the electronic device has a plurality of input members, and wherein the electronic device has stored therein a map file comprising an assignment of each character to a corresponding input member, and further comprising:
   detecting a press-and-hold actuation of a particular input member; and
   outputting at least a first character from the map file that is assigned to the particular input member and is in the inactive character set.

8. The method of claim 7, further comprising detecting as the input of the particular character at least one of a navigational input and a selection input with respect to the particular character.

9. The method of claim 7, further comprising detecting as the input of the particular character an input of a character from the map file that is not already included in the active character set.

10. An electronic device comprising:
   a processor apparatus comprising a processor and a memory, the memory having stored therein a plurality of objects comprising a plurality of characters, at least some of the characters being in an active character set and others at least initially being in an inactive character set;
   an input apparatus structured to provide input to the processor apparatus; and
   the memory further having stored therein a number of routines which, when executed on the processor, cause the electronic device to perform operations comprising:
      detecting an input of a particular character in the inactive character set and not included in the active character set;
      updating the active character set to include the new character as part of the active character set;
      detecting an ambiguous text input; and
      employing the updated active character set in disambiguating the ambiguous text input.

11. The electronic device of claim 10 wherein the operations further comprise outputting the particular character as at least a portion of an interpretation of the ambiguous text input.

12. The electronic device of claim 10 wherein the number of objects further comprise a number of language objects stored in at least a first dictionary, and wherein the operations further comprise:
   detecting the input of the particular character as being a part of a new language object not already stored on the electronic device; and
   storing the new language object in the at least first dictionary.

13. The electronic device of claim 12 wherein the operations further comprise outputting a number of interpretations of the ambiguous input, at least some of the interpretations each comprising at least an initial number of the characters of a language object of the number of language objects, at least one of the interpretations comprising the particular character and being an artificial variant that does not correspond with a language object.

14. The electronic device of claim 13 wherein the operations further comprise outputting the artificial variant at a location of relatively lower priority than the at least some of the interpretations.

15. The electronic device of claim 10 wherein the active character set comprises a static portion and a modifiable portion, and wherein the storing of the new character set comprises adding the new character to the modifiable portion of the active character set.

16. The electronic device of claim 10 wherein the input apparatus comprises a plurality of input members, and wherein the memory has stored therein a map file comprising an assignment of each character to a corresponding input member, and wherein the operations further comprise:
   detecting a press-and-hold actuation of a particular input member; and
   outputting at least a first character from the map file that is assigned to the particular input member and is in the inactive character set.

17. The electronic device of claim 16 wherein the operations further comprise detecting as the input of the particular character at least one of a navigational input and a selection input with respect to the particular character.

18. The electronic device of claim 16 wherein the operations further comprise detecting as the input of the particular character an input of a character from the map file that is not already included in the active character set.

\* \* \* \* \*

UNITED STATES PATENT AND TRADEMARK OFFICE
CERTIFICATE OF CORRECTION

| | | |
|---|---|---|
| PATENT NO. | : 8,239,593 B2 | |
| APPLICATION NO. | : 12/619998 | |
| DATED | : August 7, 2012 | |
| INVENTOR(S) | : Michael Elizarov et al. | |

It is certified that error appears in the above-identified patent and that said Letters Patent is hereby corrected as shown below:

In the drawings: In FIG. 3A, block 224, line 1, "OBJECT,IDENTIFY" should read

--OBJECT, IDENTIFY--.

In the drawings: In FIG. 3A, block 244, "AND/ OR" should read --AND/OR--.

In the drawings: In FIG. 6, in the diamond representing step 524, line 4, "THEN" should read

--THAN--.

In column 1, line 11, "No. 7,644,209 the disclosure" should read

--No. 7,644,209, the disclosure--.

In column 1, line 49, "ten keys eight" should read --ten keys, eight--.

In column 4, line 19, "formats that can" should read --formats can--.

In column 4, line 23, "device." should read --device;--.

In column 5, line 52, "thumbwheel 34" should read --thumbwheel 32--.

In column 6, line 27, "characters 28." should read --characters 48.--.

In column 7, line 26, "memory 22." should read --memory 20.--.

In column 7, line 31, "having frequency value" should read --having a frequency value--.

In column 7, line 64, "N-grams 112." should read --N-gram objects 112.--.

Signed and Sealed this
Sixteenth Day of October, 2012

David J. Kappos
*Director of the United States Patent and Trademark Office*

CERTIFICATE OF CORRECTION (continued)
U.S. Pat. No. 8,239,593 B2

In column 8, line 66, "as well the" should read --as well as the--.

In column 9, line 30, "is build up" should read --is built up--.

In column 9, lines 35-36, "completed the current session is ended an a new" should read --completed, the current session is ended and a new--.

In column 10, line 11, "data and is therefore" should read --data is therefore--.

In column 10, lines 58-59, "to a four letter prefixes." should read --to four-letter prefixes.--.

In column 11, line 15, "orphan object" should read --orphan objects--.

In column 11, line 37, "setting a flag," should read --setting of a flag,--.

In column 11, line 45, "include" should read --includes--.

In column 11, line 61, "would have causes" should read --would have caused--.

In column 12, line 4, "input the previous" should read --input, the previous--.

In column 13, lines 31-32, "parents of a spawned" should read --parents of spawned--.

In column 14, lines 38-39, "and alternation input," should read --an alternation input,--.

In column 14, line 47, "processor 20" should read --processor 16--.

In column 14, line 51, "been subject" should read --been the subject--.

In column 15, line 13, "frequency value 104" should read --frequency object 104--.

In column 15, line 23, "word object 104" should read --word object 108--.

In column 15, line 31, "new words database 96," should read --new words database 92,--.

In column 15, line 35, "new words database 96." should read --new words database 92.--.

In column 15, line 62, "memory 22" should read --memory 20--.

In column 15, line 67, "memory 22" should read --memory 20--.

In column 16, line 13, "memory 22." should read --memory 20.--.

In column 16, line 19, "processor 20" should read --processor 16--.

CERTIFICATE OF CORRECTION (continued)

U.S. Pat. No. 8,239,593 B2

In column 16, line 20, "associate such" should read --associated with such--.

In column 17, line 2, "input device 8." should read --input apparatus 8.--.

In column 17, lines 42-43, "device 4 the only" should read --device 4, the only--.

In column 19, lines 61-62, "regardless of associated" should read --regardless of the associated--.

In column 20, line 22, "embodiment the quantity" should read --embodiment, the quantity--.

In column 20, line 54, "memory 22" should read --memory 20--.

In column 20, line 57, "memory 22" should read --memory 20--.

In column 20, line 60, "three character N-gram" should read --three-character N-gram--.

In column 21, lines 62-63, "as an artificial variants." should read --as artificial variants.--.

In column 22, line 27, "storage the absolute" should read --storage, the absolute--.

In column 23, line 37, "key the user" should read --key, the user--.

In column 25, line 29, "<NEXT> 40" should read --<NEXT> key 40--.

In column 25, line 32, "In order the complete" should read --In order to complete--.

In column 25, lines 36-37, "additionally characters" should read --additional characters--.